(12) United States Patent
Tidwell

(10) Patent No.: US 9,317,895 B1
(45) Date of Patent: Apr. 19, 2016

(54) NON-LINEAR IMAGE MAPPING

(75) Inventor: Reed P. Tidwell, Centerville, UT (US)

(73) Assignee: XILINX, INC., San Jose, CA (US)

( * ) Notice: Subject to any disclaimer, the term of this patent is extended or adjusted under 35 U.S.C. 154(b) by 842 days.

(21) Appl. No.: 13/571,035

(22) Filed: Aug. 9, 2012

(51) Int. Cl.
*G06T 3/40* (2006.01)
*G06G 5/00* (2006.01)
*G02B 27/01* (2006.01)
*G01C 21/36* (2006.01)

(52) U.S. Cl.
CPC .. *G06T 3/40* (2013.01); *G06G 5/00* (2013.01); *G01C 21/365* (2013.01); *G02B 27/01* (2013.01); *G02B 2027/011* (2013.01)

(58) Field of Classification Search
None
See application file for complete search history.

(56) References Cited

U.S. PATENT DOCUMENTS

| | | | |
|---|---|---|---|
| 5,414,439 A | 5/1995 | Groves et al. | |
| 7,466,323 B2 | 12/2008 | Krishnamurthy et al. | |
| 7,477,323 B2 | 1/2009 | Chou | |
| 2001/0019361 A1* | 9/2001 | Savoye | 348/222 |
| 2004/0008204 A1* | 1/2004 | Deering et al. | 345/539 |
| 2004/0012610 A1* | 1/2004 | Taneja et al. | 345/611 |
| 2005/0134599 A1* | 6/2005 | Nayar et al. | 345/589 |
| 2006/0050083 A1* | 3/2006 | Lachine et al. | 345/611 |
| 2007/0104394 A1* | 5/2007 | Chou | 382/300 |
| 2009/0237803 A1* | 9/2009 | Hotta et al. | 359/630 |
| 2009/0243963 A1* | 10/2009 | Hotta et al. | 345/7 |
| 2009/0262192 A1* | 10/2009 | Schofield et al. | 348/148 |
| 2009/0278765 A1* | 11/2009 | Stringfellow | G02B 27/01 345/7 |
| 2010/0073773 A1* | 3/2010 | Hotta et al. | 359/630 |
| 2010/0253593 A1* | 10/2010 | Seder et al. | 345/7 |
| 2010/0289632 A1* | 11/2010 | Seder et al. | 340/436 |
| 2012/0250937 A1* | 10/2012 | Corcoran et al. | 382/103 |

OTHER PUBLICATIONS

Li et al.—An Arbitrary Ratio Resizer for MPEG Applications, Aug. 2000, IEEE Transactions on Consumer Electronics, vol. 46, No. 3, 467-473.*
Li, Renxiang et al., "An Arbitrary Ratio Resizer for MPEG Applications" *IEEE Transactions on Consumer Electronics,* Aug. 2000, pp. 467-473, vol. 46, No. 3, IEEE, Piscataway, New Jersey, USA.

* cited by examiner

*Primary Examiner* — Geepy Pe
*Assistant Examiner* — William Adrovel
(74) *Attorney, Agent, or Firm* — W. Eric Webostad

(57) ABSTRACT

In an apparatus for digital image processing, a mapper is coupled to receive destination pixel information in terms of a source pixel space, and to provide a 2-dimensional filter kernel with source pixels for the destination pixel information. An oversampled filter includes predetermined coefficients. A filter coefficient module is configured to select phase coefficients from the predetermined coefficients stored in the oversampled filter based on proximity to the source pixels in the filter kernel, and coupled to provide a filter coefficient for each of the source pixels in the filter kernel. A convolution module is coupled to receive the source pixels and the filter coefficients, and to provide a convolution result. The convolution module is configured to apply the filter coefficients to the source pixels in a convolution to provide the convolution result. A normalization module is configured to normalize either the convolution result or the filter coefficients.

20 Claims, 16 Drawing Sheets

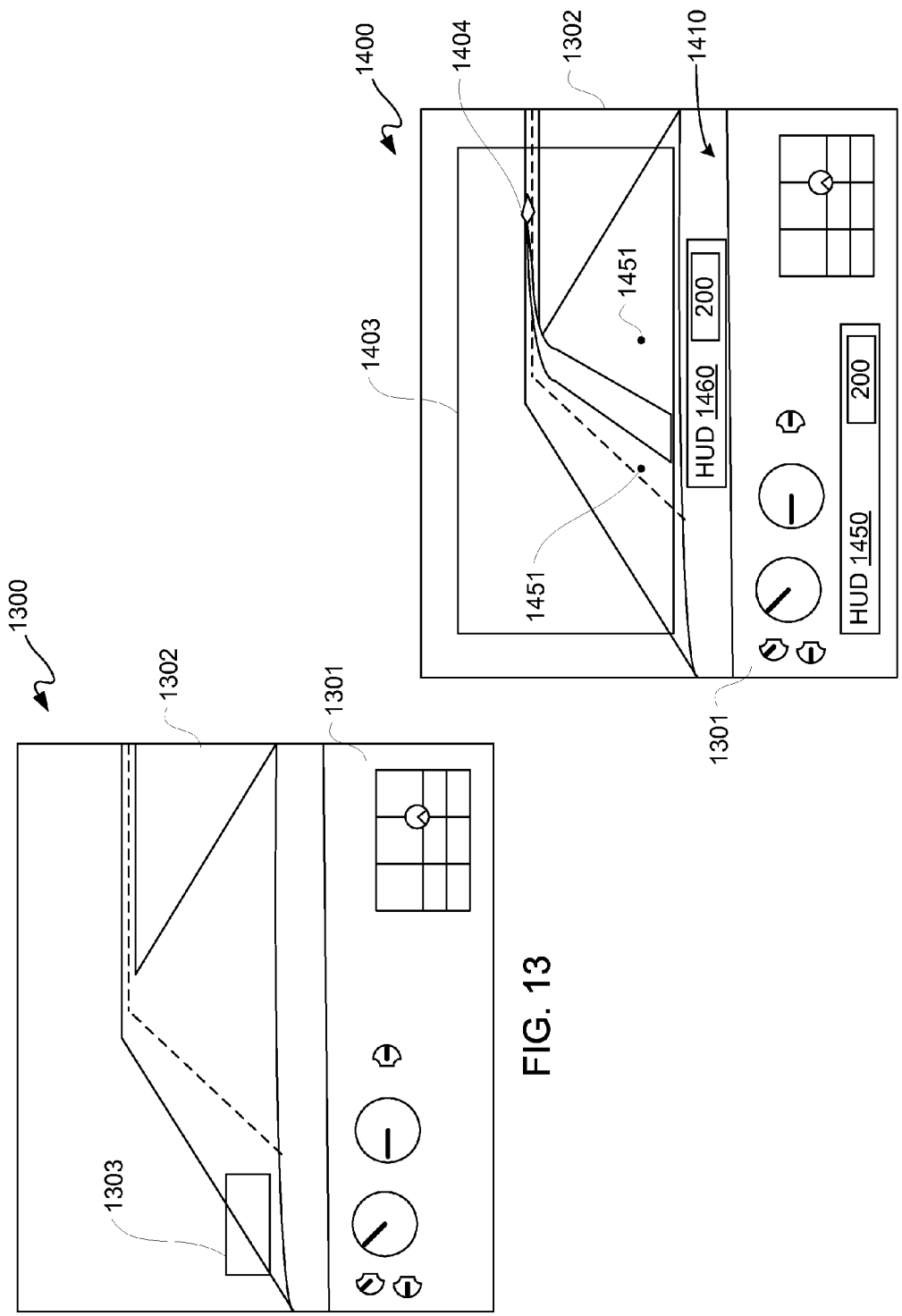

NON-LINEAR IMAGE MAPPING

TECHNICAL FIELD

An embodiment relates to digital image processing using integrated circuit devices ("ICs"). More particularly, an embodiment relates to digital image predistortion for nonlinear image mapping.

BACKGROUND

Traditionally, a single set of horizontal and vertical scale factors have been used for video scaling an entire image. In such traditional rectilinear scaling, a destination image is orthogonal to a source image. For such traditional scaling, a fixed filter kernel size and a small set of filter phases are used for decomposition of a filter into a cascade of one-dimensional filters, sometimes referred to as separable filters. However, such traditional scaling is generally not suitable for nonlinear image mapping.

For nonlinear image mapping or remapping, such as for example for off-axis dome projection, a video signal may be pre-distorted to look correct from a viewing position, such as when projected onto a dome for example. Heretofore, there were generally three types of video signal predistortion, namely: off-line, frame-by-frame processing using high quality filtering techniques in software, such as Adobe After Effects for example; render-to-texture by graphics processing units ("GPUs"); and projection of an image onto a curved mirror with geometry corresponding to that of a dome. However, each of these conventional types of video signal predistortion has a limitation. For example, off-line, frame-by-frame processing conventionally takes a significant amount of time and thus may not practical in some real-time live video applications. GPU render-to-texture may provide real-time performance, but it generally does so with diminished image quality, which may be due in part due to limitations associated with bilinear blending filtering used by GPUs. Projection onto a curved mirror is a mechanical solution that lacks flexibility.

Accordingly, it would be both desirable and useful to provide video signal predistortion suitable for real-time applications with enhanced quality and flexibility as compared with one or more of the above-mentioned conventional types of video signal predistortion.

SUMMARY

One or more embodiments generally relate to digital image processing.

An embodiment relates generally to an apparatus. In such an embodiment, a mapper is coupled to receive destination pixel information in terms of a source pixel space, and further coupled to provide a 2-dimensional filter kernel with source pixels for the destination pixel information. An oversampled filter includes predetermined coefficients. A filter coefficient module is configured to select phase coefficients from the predetermined coefficients stored in the oversampled filter based on proximity to the source pixels in the filter kernel, and coupled to provide a filter coefficient for each of the source pixels in the filter kernel. A convolution module is coupled to receive the source pixels and the filter coefficients, and further coupled to provide a convolution result. The convolution module is configured to apply the filter coefficients to the source pixels in a convolution to provide the convolution result. A normalization module is configured to normalize either the convolution result or the filter coefficients.

In the embodiment described in the preceding paragraph, such apparatus may further include one or more of the following. The oversampled filter can be a finite impulse response filter. The finite impulse response filter can include a lookup table storing the predetermined coefficients. The normalization module can be coupled to receive the convolution result from the convolution module and configured to normalize the convolution result. The normalization module can be coupled to receive the filter coefficients from the filter coefficient module and to provide normalized versions of the filter coefficients. The normalization module can be coupled to provide the normalized versions of the filter coefficients to the convolution module for application to the source pixels for the convolution. The mapper can further be coupled to receive an X-scaling factor and a Y-scaling factor for the destination pixel information. The oversampled filter can be configurable with respect to size, shape, and orientation responsive to scaling and content of an image associated with the destination pixel information. The filter coefficient module can store the filter coefficients in a lookup table for retrieval. The lookup table can be configured to retrieve the filter coefficients responsive to distance from a center of the oversampled filter. The oversampled filter can be configured to be dynamically shaped responsive to an applied filter. The filter coordinates can be used to look up the predetermined coefficients of the oversampled filter are remappable responsive to the applied filter. The filter coefficient module can store the predetermined coefficients in a lookup table with addresses representing distances. The lookup table can be configured as a one-dimensional, radially addressed lookup table.

An embodiment relates generally to a vehicle. In such an embodiment, a video and graphics processing module has an image predistorter. A head up display ("HUD") is coupled to the video and graphics processing module. A global positioning system is coupled to the video and graphics processing module. At least one camera is coupled to the video and graphics processing module. The global positioning system is coupled to provide navigation symbology to the video and graphics processing module responsive to position information. The video and graphics processing module is configured to register the navigation symbology from the global positioning system with image information from the at least one camera and further configured to provide a display image. The image predistorter is configured to predistort the display image for projection onto a windshield in a three dimensional perspective. The HUD is coupled to receive the predistorted display image.

In the embodiment described in the preceding paragraph, such vehicle may further include one or more of the following. The image predistorter can include a mapper coupled to receive destination pixel information in terms of a source pixel space and to provide a 2-dimensional filter kernel with source pixels for the destination pixel information. The image predistorter can include an oversampled filter including predetermined coefficients. The image predistorter can include a filter coefficient module can be configured to select phase coefficients from the predetermined coefficients based on proximity to the source pixels in the filter kernel and coupled to provide a filter coefficient for each of the source pixels in the filter kernel. The image predistorter can include a convolution module coupled to receive the source pixels from the mapper and the filter coefficients from the filter coefficient module, and further coupled to provide a convolution result. The convolution module can be configured to apply the filter coefficients to the source pixels in a convolution to provide the convolution result. The image predistorter can include a normalization module configured to normalize either the convolution result or the filter coefficients. The HUD can be coupled to receive the display image predistorted for projection onto the windshield in the three dimensional perspective visually aligned with real-world objects viewable by a driver. The HUD can be an on-dash HUD. A lenticular material can be positioned over the HUD. The display image cannot be directly viewable due to being obscured by the lenticular material. The display image can be configured for viewing as a reflected image in the windshield.

Another embodiment relates generally to another vehicle. In such an embodiment, a video and graphics processing module has an image predistorter. A head up display ("HUD") is coupled to the video and graphics processing module. At least one sensor camera is coupled to the video and graphics processing module. At least one visual camera is coupled to the video and graphics processing module. The video and graphics processing module is coupled to register a sensor image from the at least one sensor camera with a visual image from the at least one visual camera, and further coupled to provide a display image. The image predistorter is configured to predistort the display image for projection onto a windshield in a three dimensional perspective. The HUD is coupled to receive the predistorted display image.

In the embodiment described in the preceding paragraph, such vehicle may further include one or more of the following. The image predistorter can include a mapper coupled to receive destination pixel information in terms of a source pixel space to provide a 2-dimensional filter kernel with source pixels for the destination pixel information. The image predistorter can include an oversampled filter including predetermined coefficients. The image predistorter can include a filter coefficient module configured to select phase coefficients from the predetermined coefficients stored in the oversampled filter based on proximity to the source pixels in the filter kernel, and coupled to provide the selected phase coefficients as the filter coefficients. The image predistorter can include a convolution module coupled to receive the source pixels from the mapper and the filter coefficients from the filter coefficient module, and further coupled to provide a convolution result. The convolution module is configured to apply the filter coefficients to the source pixels in a convolution to provide the convolution result. The image predistorter can include a normalization module configured to normalize either the convolution result or the filter coefficients. The HUD can be an in-dash HUD. The HUD can be an on-dash HUD. The HUD can be coupled to receive the predistorted display image for projection onto the windshield in the three dimensional perspective visually aligned with real-world objects viewable by a driver. A lenticular material can be positioned over the HUD. The display image cannot be directly viewable due to being obscured by the lenticular material. The display image can be configured for viewing as a reflected image in the windshield.

BRIEF DESCRIPTION OF THE DRAWINGS

Accompanying drawings show exemplary embodiments. However, the accompanying drawings should not be taken to limit the embodiments shown, but are for explanation and understanding only.

FIGS. 6-1 and 6-2 are flow diagrams depicting respective exemplary embodiments of pixel processing flows.

FIG. 7-1 is a perspective view depicting an exemplary embodiment of a 2-D windowed sinc filter.

FIG. 7-2 is a grid diagram a depicting an exemplary embodiment of a warping map.

FIG. 13 is a pictorial diagram depicting an exemplary embodiment of a conventional HUD-out-the-window view.

FIG. 14 is a pictorial-block diagram depicting an exemplary embodiment of a HUD-out-the-window view ("HUD view").

DETAILED DESCRIPTION

Figure 1:
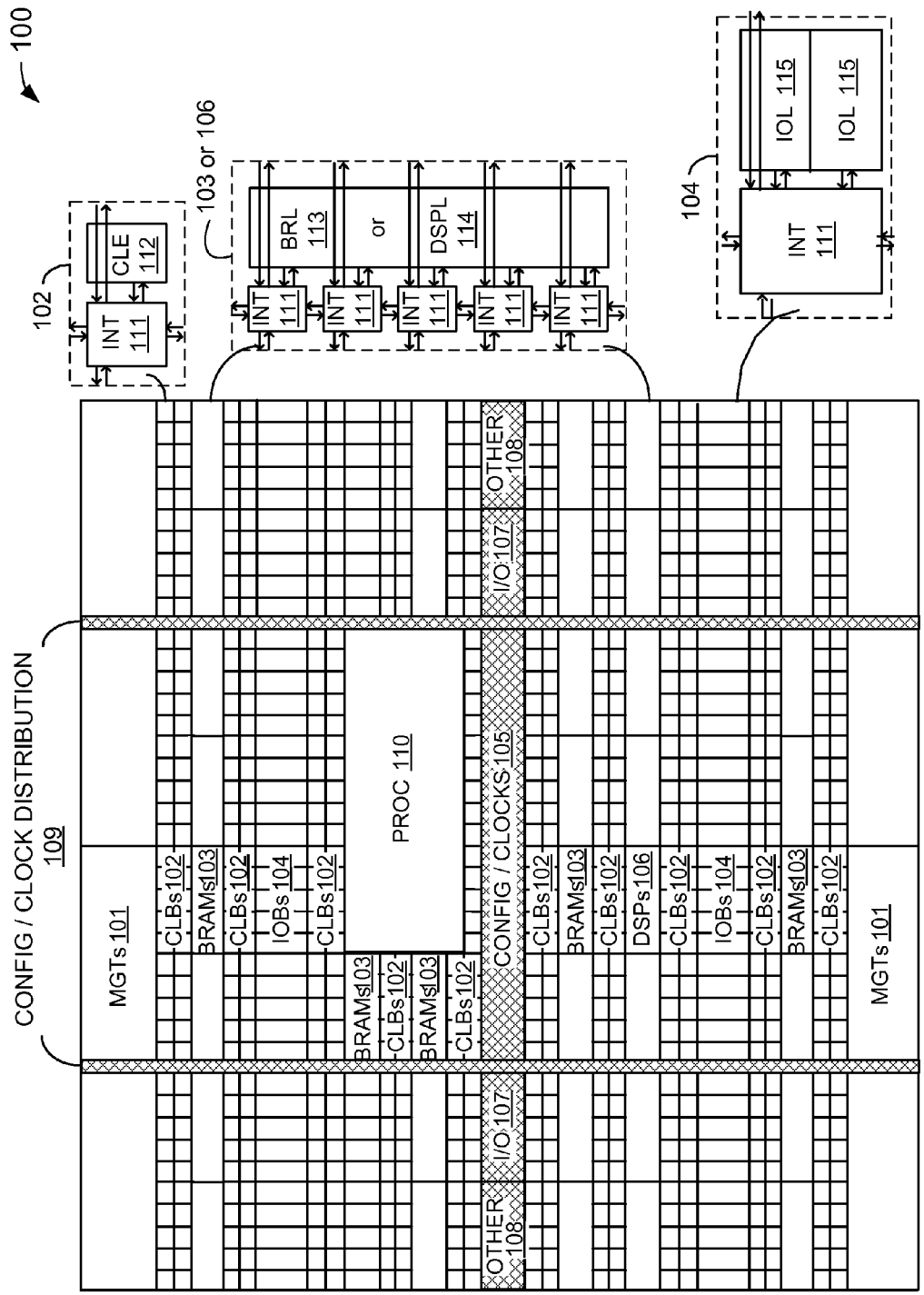
FIG. 1 is a simplified block diagram depicting an exemplary embodiment of a columnar Field Programmable Gate Array ("FPGA") architecture.

In the following description, numerous specific details are set forth to provide a more thorough description of the specific embodiments. It should be apparent, however, to one skilled in the art, that one or more embodiments may be practiced without all the specific details given below. In other instances, well known features have not been described in detail so as not to obscure the one or more embodiments. For ease of illustration, the same number labels are used in different diagrams to refer to the same items; however, in alternative embodiments the items may be different.

Before describing exemplary embodiments illustratively depicted in the several figures, a general introduction is provided to further understanding.

Generally, an image is rectilinear. However, projection or display of an image may be off-axis or on-axis but onto an irregular (non-rectilinear) surface.

As described below, an image, including video, may be predistorted so as to appear rectilinear to an observer. Even though orientation of a projector or contour of a projection or display surface is described, there are other examples of predistortion correction. For example, a telepresence video conference may have a camera that is off-axis, even though a display surface, such as monitor screen for example, for such projection is rectilinear. Furthermore, an image may be projected on-axis; however, the surface supporting the projector may be off-axis or tilted. Moreover, a camera may be in a fixed position, and a person or other object may move about an area within such camera's field of view, predistortion as described herein below may be used to make it appear as though the object is centered to the camera without having to move the camera. Optionally, size of an image may have to be scaled up or down or both. So even though the following description is generally in terms of projection of live video onto a non-rectilinear surface, it should be understood that there are other useful applications. With the above general understanding borne in mind, various embodiments for digital image predistortion for non-linear image mapping are generally described below.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles or programmable logic resources. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
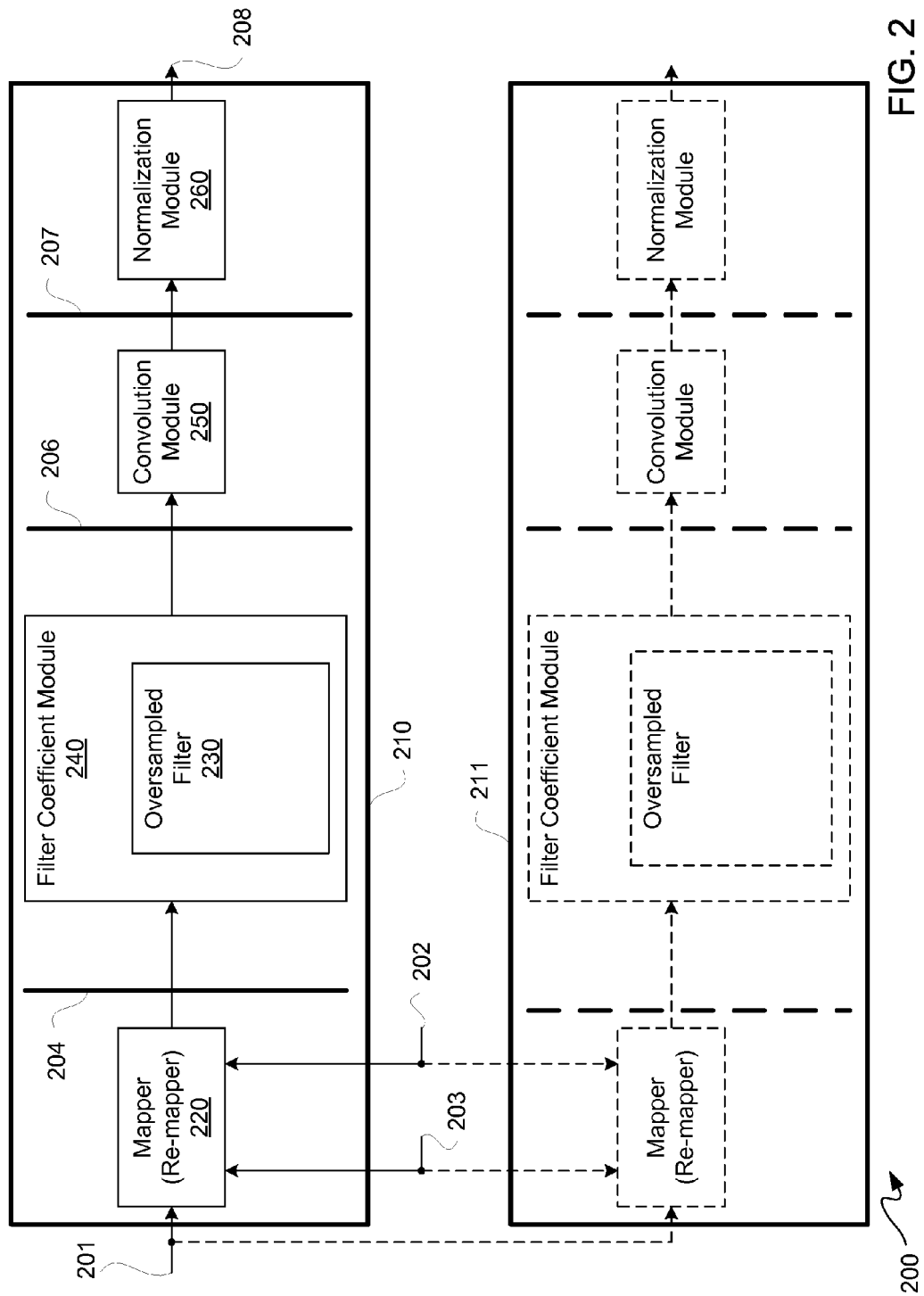
FIG. 2 is a block diagram depicting an exemplary embodiment of image predistorter.

FIG. 2 is a block diagram depicting an exemplary embodiment of image predistorter 200. Image predistorter 200 includes a predistortion block 210. In an embodiment, predistortion block 210 is for two-dimensional ("2-D") image predistortion. In such an embodiment, a 2-D oversampled filter may be provided with a 2-D finite impulse response ("FIR") filter, as described below in additional detail. In another embodiment, separable predistortion blocks 210 and 211 may be used. In such an embodiment, one of predistortion blocks 210 and 211 may be used for one-dimensional ("1-D") image predistortion in one direction, such as for horizontal image predistortion processing for example, and another of predistortion blocks 210 and 211 may be used for 1-D image predistortion in another direction, such as for vertical image predistortion processing. In such an embodiment, a 1-D oversampled filter may be provided with a 1-D FIR filter, as described below in additional detail.

Other than being configured for either horizontal or vertical image processing for example, predistortion blocks 210 and 211 may be the same. While the following description is directed in the main toward video image processing, other types of image processing may be performed. Thus, by image, it should be understood to include either or both moving digital images and/or still digital images. Furthermore, for purposes of clarity and not limitation, only predistortion block 210 is described in detail, and not predistortion block 211 to avoid repetition. Moreover, predistortion block 210 is generally described as being for 2-D image predistortion, though predistortion block 210 may be used for 1-D image predistortion, as will be understood from the following description.

A video or other image signal 201 having destination pixel information, namely output pixel information, is provided as an input to a mapper or re-mapper 220 of predistortion block 210. In addition to mapper 220, predistortion block 210 includes filter coefficient module 240, convolution module 250, and normalization module 260. Such destination pixel information is provided in terms of a source pixel space. Mapper 220 is configured to provide a 2-dimensional filter kernel with source pixels for such destination pixel information. While the following description is provided in terms of hardware, it should be understood that software or a combination of software and hardware may be used to provide predistortion block 210. More particularly, the following description is generally in terms of an FPGA implementation using DSP resources thereof for real-time video processing. Furthermore, even though dome projection is generally described, it should be understood that one or more embodiments hereof may be used for one or more other types of corrections, including without limitation barrel, pincushion, horizontal keystone, vertical keystone, and/or rotation, among other types of applications of predistortion to provide correction in a viewing space. Furthermore, even though dome projection is described, other applications include telepresence and surveillance, among others. Lastly, by providing predistortion block 210 using an FPGA, flexibility of solution is provided over DSPs, GPUs, and ASICs.

Figure 3:
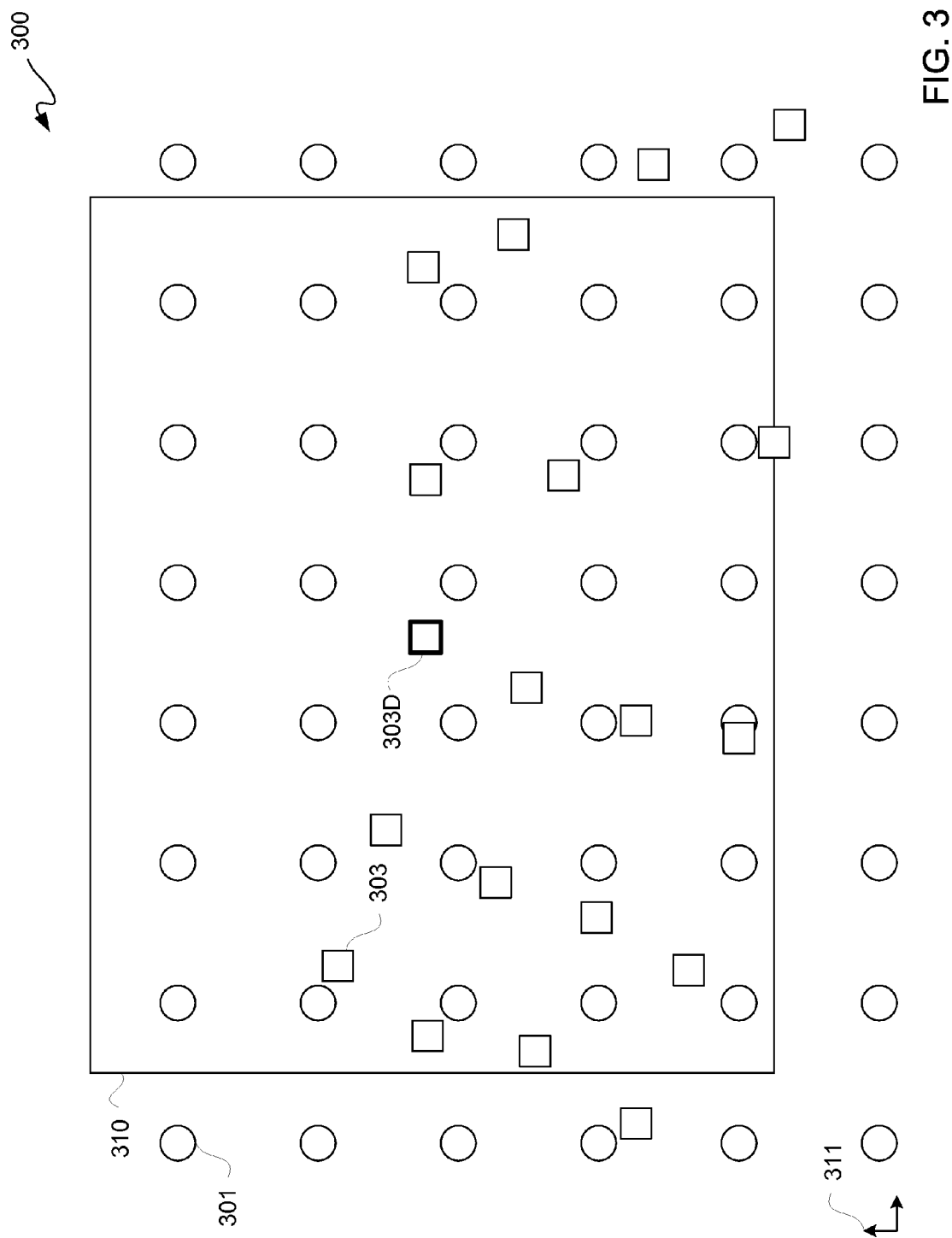
FIG. 3 is a pixel diagram depicting an exemplary embodiment of an arbitrary remapping of a portion of an image in source pixel coordinates.

For purposes of clarity by way of example not limitation, FIG. 3 is a pixel diagram depicting an exemplary embodiment of an arbitrary remapping of a portion of an image 300 in source pixel coordinates 311, as generally represented by an X-Y arrow. By "arbitrary remapping," it is generally meant a mapping of destination pixels to a source pixel, where there is generally no regularity in location and/or scale of such destination pixels. It should be appreciated that other types of remappings or mappings, including without limitation linear, regular, or complex, may be used in accordance with the description herein.

In image 300, circles represent source pixels 301; squares represent destination pixels 303; and a thick square represents a destination pixel of interest, namely destination pixel 303D. Destination pixel 303D may be an output pixel currently being processed. In this example of FIG. 3, a five-by-five source pixel space, prior to scaling, is used as generally indicated by box 310. Box 310 represents a 2-dimensional filter kernel, namely filter kernel 310. With simultaneous reference to FIGS. 2 and 3, image predistorter 200 is further described.

To generate a filter phase, location of a destination pixel of interest, namely destination pixel 303D, is provided in terms of source pixel coordinates 311. Each destination pixel 303 may be processed as described herein; however, generally processing of a single destination pixel 303D is described for purposes of clarity. Location of each destination pixel in terms of source pixel coordinates for linear mappings may be derived from a start position and per-pixel offsets of each such destination pixel. For regular and complex mappings, a sparse grid may be used. Such sparse grid may be stored. For purposes of clarity by way of example and not limitation, one set of mapping coordinates and scale factors may be stored for every 32×32 destination pixels in a sparse grid, and such coordinate and scale factor set may be interpolated to obtain per-pixel mappings. However, in other embodiments, other grid spacings may be used.

In the example of FIG. 3, filter kernel 310 nominally is a five-by-five filter size before scaling, which is used for resampling. However, it should be understood that other filter sizes may be used. Filter kernel 310 includes source pixels 301 for a destination pixel 303D currently being processed.

Horizontal pixel scaling may be different from vertical scaling subject to an X-scaling factor and a Y-scaling factor, respectively, used for each destination pixel. Scale factors may be provided to mapper 220 via X scale factor signal 203 and Y scale factor signal 202. Such X and Y scale factors for each destination pixel 303 may be obtained by interpolation per destination pixel 303 using a stored sparse grid or by calculation using source-space locations of neighboring destination pixels.

For example in an embodiment, in a vertical direction, there may be magnification or upsampling of source pixels, and in a horizontal direction there may be reduction or downsampling of source pixels, or vice versa. Furthermore, in an embodiment, there may be no scaling. Accordingly, upsampling, downsampling, or no scaling in a horizontal and/or vertical direction may be used in any combination. However, for purposes of clarity by way of example not limitation, it shall be assumed that upsampling is used in a vertical direction and downsampling is used in a horizontal direction in the example of FIG. 3. Features that use image scaling include without limitation, picture-in-picture, zoom in, and zoom out, among others.

To generally maintain uniform quality in a destination image, as well as to avoid or mitigate against aliasing, additional low-pass filtering may be used in the horizontal direction. Such additional low-pass filtering may be provided by expanding filter kernel 310 in a horizontal direction. For a downsampling ratio of 5/4, namely a destination pixel size divided by a source pixel size, filter kernel 310 may be stretched or expanded in a horizontal direction corresponding to approximately 6.25 source pixels wide. Thus, in this example, filter kernel 310 may be 5-by-6.25 in source pixel space after scaling. It should be understood that other down-sampling ratios, as well as upsampling ratios, may be used. Along those lines, image predistorter 200 may be configured for any arbitrary ratio resizing or remapping.

With location of each destination pixel in terms of source pixel coordinates and with any X and Y scale factors for each such destination pixel, a filter phase may be determined for each such destination pixel as described herein. It should be understood that each such filter phase may be determined to correct for an associated destination pixel. In other words, each such filter phase may be tailored or customized to such destination pixel. Such customization or correctness of a filter phase on a per destination pixel basis provides for a high-quality image.

In contrast to conventional multiphase techniques, kernel filter size may be varied for each destination pixel filter phase using a single oversampled filter. In other words, kernel filter size may be dynamically tailored to each destination pixel as effectively overlaid on an oversampled filter. Along those lines, the number of taps for each finite impulse response ("FIR") may be varied with a fine granularity. Such an FIR may include a lookup table having predetermined coefficients in the above example, when the number of taps in a horizontal direction increases from 5 to 6.25. A fine granularity facilitates smaller jumps in filter kernel sizes, namely smaller jumps in the number of taps inside a filter kernel, and hence smoother filtering. Furthermore, as described below in additional detail, for non-uniform spacings of destination pixels with respect to source pixels, one or more scaling factors, and consequently size of filter kernels, may vary from pixel to pixel. By providing in filter coefficient module 240 an oversampled filter 230, namely a filter with a large number of closely spaced coefficients stored for rapid access, a uniformly high image quality may be obtained across an image without a large number of filter kernel sizes and without a large number of filter phases for each of such kernel sizes being stored. As shall be appreciated from the following description, variations in kernel size, filter phase, and number of taps in each FIR operation may be dynamically accommodated for real-time video projection.

A set of source pixels 301 encompassed by filter kernel 310 may be determined or calculated based on kernel size of filter kernel 310 and based on location of a destination pixel 303D in source space of source pixels 301. Locations of a set of source pixels 301 in filter kernel 310 determine a filter phase to be used. Effectively, a custom filter phase may be provided for each destination pixel 303 selected.

Figure 4:
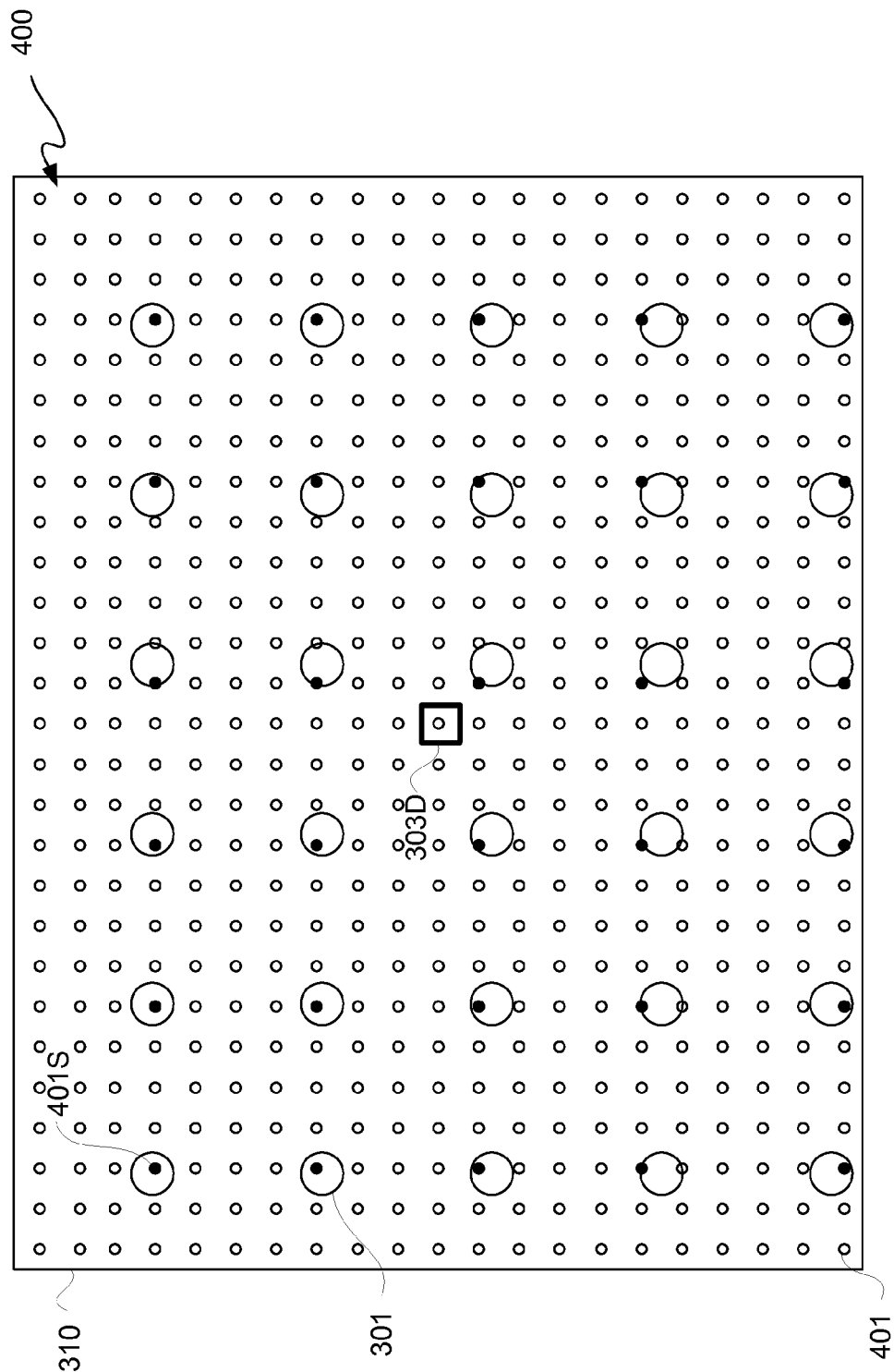
FIG. 4 is a grid diagram depicting an exemplary embodiment of coefficients of a filter grid of an oversampled filter of FIG. 2.

FIG. 4 is a grid diagram depicting an exemplary embodiment of coefficients 401 of a filter grid 400 of an oversampled filter 230 of FIG. 2. Oversampled filter 230 may be an FIR filter. Coefficients 401 may form a dense or fine grid pattern in a source space. Along those lines, source pixels 301 may be filtered with oversampled filter 230 for a destination pixel 303D in a filter kernel 310. This may be understood as having a grid of source pixels 301 overlaid on a fine filter grid 400 of coefficients 401. Coefficients 401 are pre-calculated or pre-determined for storage in oversampled filter 230 in memory readily accessible by filter coefficient module 240. For example, the coefficients can be stored in a lookup table in an FPGA.

Figure 5:
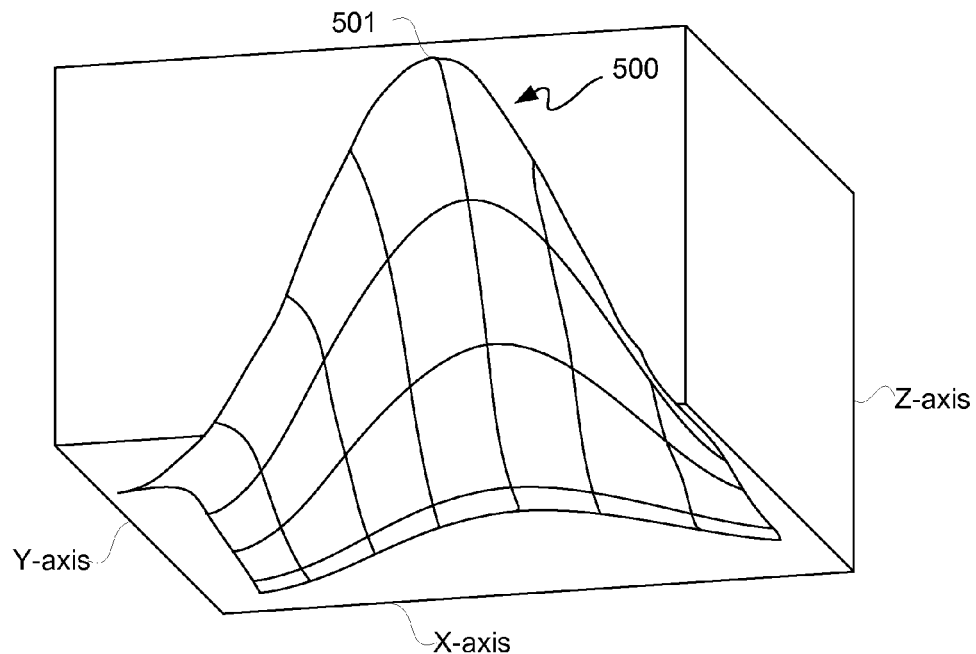
FIG. 5 is a graphical perspective view depicting an exemplary embodiment of a 2-D Gaussian filter.

Even though a top view of filter grid 400 may appear flat or planar, such filter grid in a perspective view may not appear flat or planar. FIG. 5 is a graphical perspective view depicting an exemplary embodiment of a 2-D Gaussian filter 500. Even though a top view of a Gaussian filter 500 may appear as a flat rectangle or square, such a 2-D Gaussian filter 500 in a perspective view may generally appear as illustratively depicted in FIG. 5, where X and Y axes indicate number of taps in horizontal and vertical directions, respectively, and a Z-axis indicates magnitude values, which may be normalized, associated with color, brightness, intensity, or other image parameter. Oversampled filter 230 of FIG. 2 in an embodiment may be a 2-D Gaussian filter, such as Gaussian filter 500 for example.

A peak 501 of Gaussian filter 500 may be a center of oversampled filter 230. However, in other embodiments, such peak 501 may be off-center in other embodiments. In short, a destination pixel 303D is aligned to the center of a filter grid, wherever such center of such oversampled filter 230 is located. However, a destination pixel 303D may or may not be aligned to a filter peak 501.

With simultaneous reference to FIGS. 2 through 5, coefficients 401 proximate to locations of source pixels 301 in filter kernel 310 may be looked up in oversampled filter 230 for a destination pixel 303D. For example, in an embodiment, nearest neighbor coefficients 401 to each of source pixels 301 within filter kernel 310 may be selected as phase coefficients 401S to provide to filter convolution module 250. This embodiment is illustratively depicted in FIG. 4. However, in other embodiments, interpolation using a set of nearest neighboring coefficients 401 to source pixels 301 within filter kernel 310 may be used to generate values for phase coefficients 401S. It should be appreciated that "phase" as used herein generally refers to a set of coefficients to be applied to the destination pixels 301 in the vicinity of the destination pixel of interest 303D. If a destination pixel happened to fall directly on a source pixel, such source pixel could be used as the destination pixel. However, generally a weighted average of source pixels, with coefficients as weights, is used to provide a high-quality image.

Filter coefficient module 240 may be configured to select a closest coefficient as a filter coefficient 401S from each set of nearest neighboring coefficients 401 for each source pixel 301 within filter kernel 310 to provide a phase of filter for a destination pixel 303.

Selected filter coefficients 401S, as generally indicated with solid dots of coefficients 401, are for a destination pixel 303D. Even though the example of selecting a closest coefficient to each source pixel 301 within filter kernel 310 is described herein, other ways of selecting filter coefficients 401S may be used. For example, in another embodiment, filter coefficient module 240 may use geometric formulas, including without limitation determining a location in a polygon, for processing nearest neighbor phase coefficients 401 to a source pixel 301 to determine a filter coefficient 401S. In yet another embodiment, for example, filter coefficient module 240 may be configured to use interpolation of nearest neighbor coefficients 401 to a source pixel 301 to determine a filter coefficient therefor.

For purposes of clarity by way of example not limitation, it shall be assumed that closest phase coefficients 401 to source pixels 301 within filter kernel 310 are selected from predetermined coefficients to provide a set of filter coefficients 401S as a phase of filter for a destination pixel 303D. Along those lines, a set of filter coefficients 401S may be output from filter coefficient module 240 for a destination pixel 303D. For such selection, in an embodiment, destination pixel 303D may generally be centered to filter kernel 310. In other words, a fine filter grid 400 of oversampled filter 230 may generally be centered to a destination pixel 303D.

To recapitulate, filter coefficient module 240 may be used to resolve a filter coefficient for each input pixel in the kernel from a the oversampled filter to provide a phase of filter.

Convolution module 250 may be coupled to receive such set of filter coefficients 401S and configured to apply such filter coefficients to source pixels 301 within filter kernel 310 in a convolution to provide a convolution result. Generally, a weighted average of filter coefficients 401S may be determine to provide a value for destination pixel 303D. Such convolution result may be output from convolution module 252 to normalization module 260. Normalization module 260 may either normalize such convolution result, which in effect normalizes filter coefficients 401S used to provide such convolution result, or normalize filter coefficients 401S prior to convolving. Such normalized-convolution result may be provided as output 208. Output 208 may be any of a variety of image parameters, including red, green, blue, blue-difference chrominance, red-difference chrominance, luminance, or luma, or any other image parameter. It should be understood that each image parameter is generally processed separately, so there may be multiple instances of predistortion block 210 in parallel to process a variety of image parameters in real-time for live video viewing.

In order to process multiple destination pixels 303, there may be multiple instances of predistortion block 210. Furthermore, register stages 204, 206, and 207 may be respectively located between mapper 220, oversampled filter 230, filter coefficient module 240, convolution module 250, and normalization module 260 for pipelined execution.

Coefficients 401 may be stored in oversampled filter 230 in a non-normalized condition. In other words, predetermined coefficients 401 may not be normalized for storage in oversampled filter 230. However, to eliminate or substantially reduce gain, coefficients may be normalized. Because phase coefficients 401 may be selected on a destination pixel basis by filter coefficient module 240, there is no guarantee that such selected phase coefficients 401 will exactly total to a sum value of one for each destination pixel processed. Generally, such total will not be exactly equal to one because for different size filters a different number of taps may be used. In other words, because destination pixels are dynamically processed such that different filter sizes may be used between processed destination pixels, normalization may be performed by summing such coefficients dynamically selected or applied. This is to be contrasted with conventional video scaling for example, where a fixed set of coefficients are normalized when pre-computed such that their sum is exactly 1.

For FIR operation as described herein, after coefficients are selected for a destination pixel, a coefficient-source pixel result may be divided by the sum of such coefficients. This dynamic determination for normalization facilitates use of a single oversampled filter to span a wide variety of filter sizes and/or phases.

Figures 1, 6:
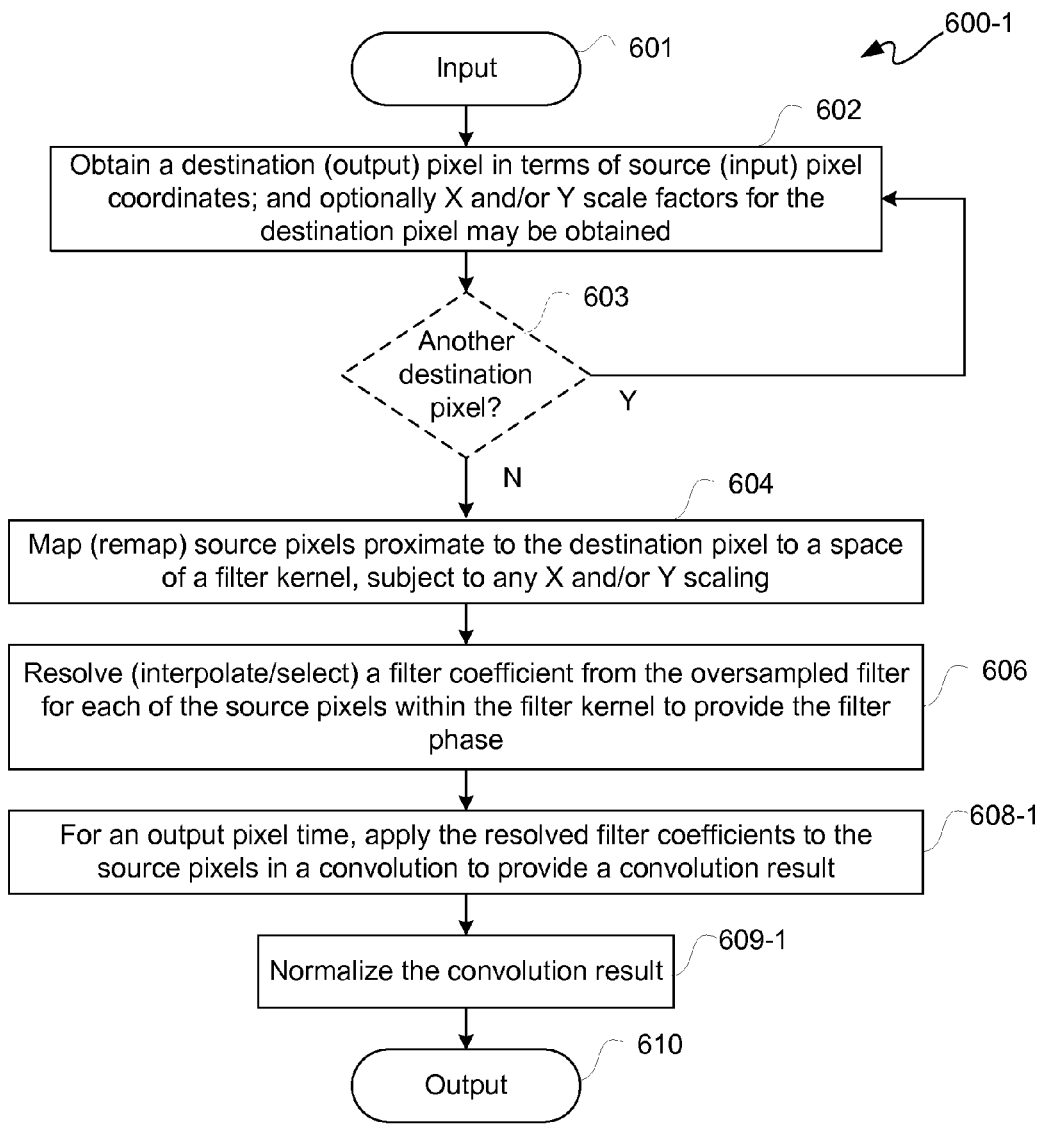
Figures 2, 6:
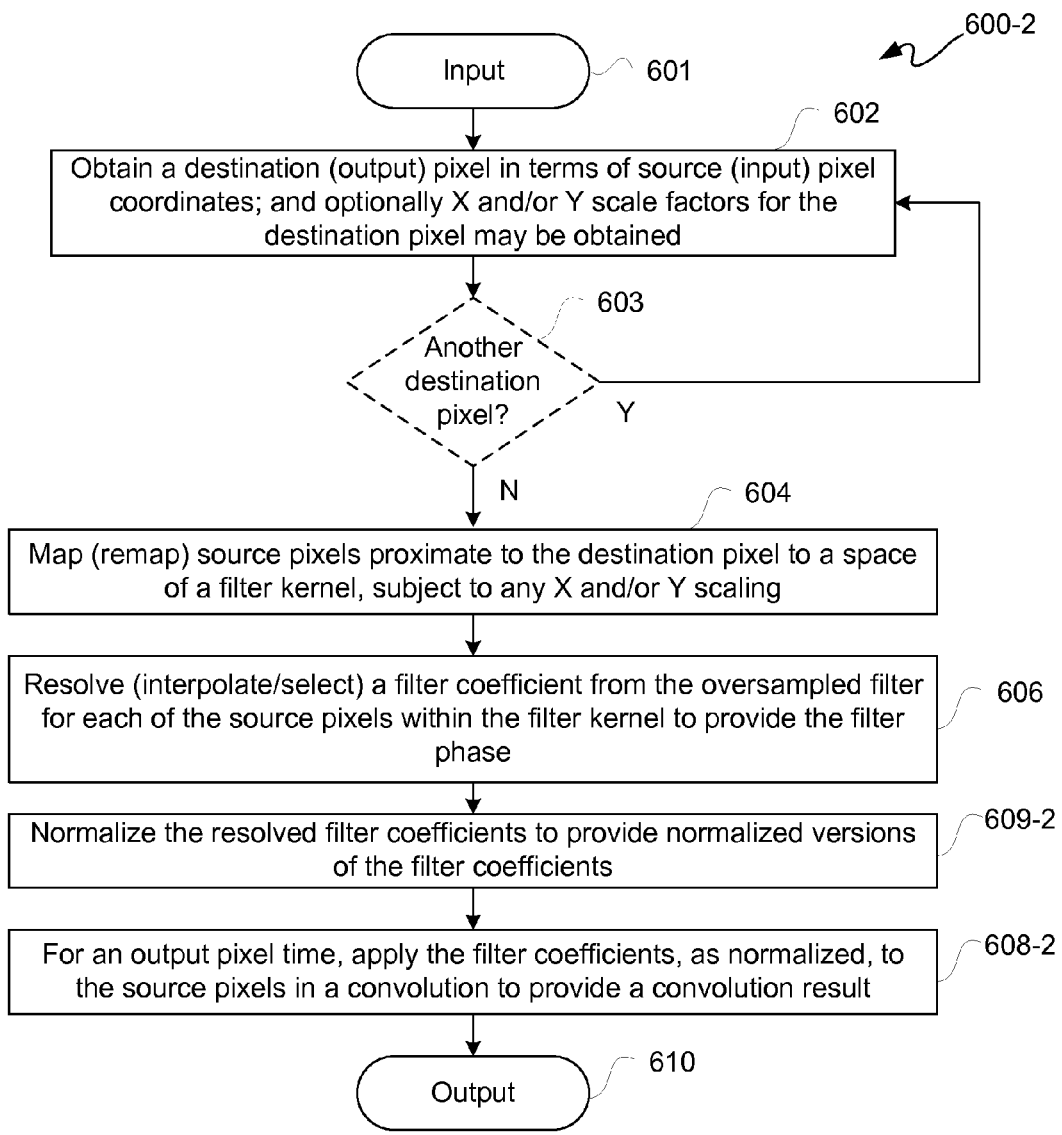
Figures 2, 7:
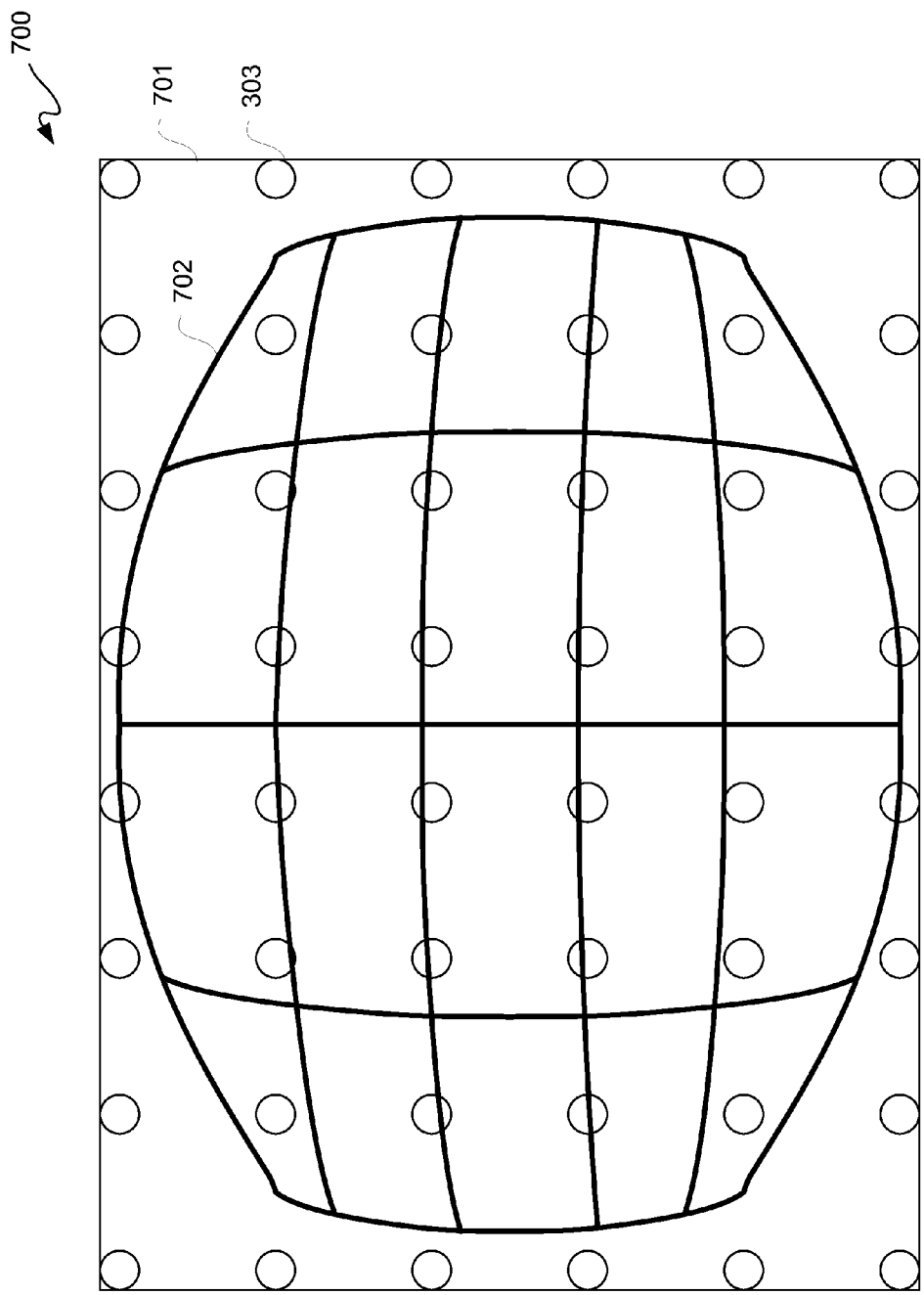

FIG. 6-1 is a flow diagram depicting an exemplary embodiment of a pixel processing flow 600-1. FIG. 6-2 is a flow diagram depicting an exemplary embodiment of a pixel processing flow 600-2. Pixel processing flows 600-1 and 600-2 are described simultaneously with reference to FIGS. 6-1 and 6-2.

Input pixels 601, which may be source pixels, are obtained. At 602 an output pixel, namely a destination pixel, is obtained in terms of input pixel coordinates, namely in terms of source pixel coordinates. Optionally, at 602 any X and/or Y scale factors for such destination pixel may be obtained. Optionally, at 603 it may be determined whether another destination pixel is to be obtained. If at 603 it is determined that another destination pixel is to be obtained, then more input pixels are provided at 601 for processing such other destination pixel. It should be understood that processing may be pipelined as generally indicated with operation 603. However, for purposes of clarity and not limitation, the remainder of pixel processing flows 600-1 and 600-2 is described in terms of processing a single destination pixel.

At 604, source pixels obtained at 601 may be mapped or remapped with respect to proximity to a destination pixel obtained at 602. Such source pixels are mapped to a space of a filter kernel subject to any X and/or Y scaling of such filter kernel. A user may set a default filter kernel size, which generally is an odd integer by an odd integer. At 606, a filter coefficient is resolved for each of the source pixels within the filter kernel to provide the filter phase. Phase coefficients may be selected from stored predetermined coefficients of the oversampled filter. Such resolution of filter coefficients may be by interpolation, selection of nearest neighbors, or other suitable criteria. For example, bilinear interpolation may be used in some applications; however, for other less rigorous applications, nearest neighbor coefficients may be selected. Furthermore, quality of result may be enhanced by storing more coefficients in oversampled filter 230, namely an enhanced granularity of coefficients stored may enhance image quality. For purposes of clarity by way of example not limitation, it shall be assumed that interpolation is used at 606 to obtain filter coefficients. This set or group of filter coefficients is a phase of filter for an associated destination pixel. Moreover, such grouping of filter coefficients is capable of dynamically changing for each destination pixel. For example, destination pixels on a same scan line may have different sets of filter coefficients. Additionally, the number of filter coefficients may vary as between destination pixels depending on the scaling of the filter kernel and how the oversampled filter aligns with input pixel locations. For example, the number of taps of an FIR filter used may vary depending upon how many source pixels fall within a kernel filter for a destination pixel. In order to address such variation, phase coefficients selected, or obtained through interpolation as described below, may be normalized.

In an embodiment, application of the oversampled filter may generally be centered to the destination pixel of interest. However, in other embodiments, even though the oversampled filter is centered over the destination pixel, some portion of the coefficients may not be used, where there are no source pixels available on one side of the destination pixels. For example, this may occur near the border of an image.

Accordingly, polyphase scaling, such as for video scaling or other image processing application, may be provided with a single oversampled filter. Using interpolation of a set of coefficients selected from such filter, which selection and interpolation may be done dynamically or on-the-fly, filter coefficients may be determined to provide a tailored or customize phase of filter for a destination pixel being processed. Furthermore, such same oversampled filter may be used for horizontal and/or vertical filtering. Moreover, the same oversampled filter may be used for upscaling and/or downscaling. Along those lines, generally any arbitrary ratio of any such scaling may be employed. Additionally, a horizontal scaling factor may be the same or different from a vertical scaling factor.

To this point, pixel processing flows 600-1 and 600-2 are the same. However, there is some difference between the two flows in the following description, as shall become apparent.

With reference to pixel processing flow 600-1, at 608-1, filter coefficients resolved at 606 are applied to associated source pixels, namely the previously described source pixels in a space of a filter kernel at 604, in a convolution to provide a convolution result. Such convolution may be a horizontal and/or a vertical convolution. At 609-1, such convolution result may be normalized, and a normalized-convolved result 610 may be output. By normalizing a convolved result 610, a single division may be used for such normalization in comparison to multiple divisions for normalizing each filter coefficient, as described below. Such normalized-convolved result 610 is a normalized value for a destination pixel, such as a magnitude of an image parameter. However, as scaling may be used, such normalized-convolved result 610 may be a scaled-normalized value for a destination pixel. Generally, such normalized-convolved result 610 may be thought of as a weighted average, where coefficient weights may not sum to one. Accordingly, normalization may adjust or scale a value for such destination pixel.

Interpolation, convolution, and normalization, as described above, may all be performed within a single output pixel time in hardware. Generally, when an image is scanned, there is at least one pixel clock used for such scanning. A unit interval of such pixel clock may be referred to a pixel time.

Because for example arbitrary scaling factors may be used, a convolution result, whether horizontal and/or vertical, is normalized by dividing such results by a sum of filter coefficients used for each destination pixel. For example, if an interpolated phase of filter had coefficients A through H, and coefficients A through H were convolved with eight source pixels, $P_0$ through $P_7$, in either a horizontal or vertical direction, then a resulting output pixel value, $P_T$, may be determined as follows:

$$P_T = (AP_0 + BP_1 + CP_2 + \ldots + GP_6 + HP_7)/(A+B+C+\ldots+G+H).$$

Even though the example of eight coefficients and eight source pixels was used, different amounts may be used in other embodiments. By normalizing filter coefficients, a single oversampled filter may be altered or change to accommodate any of a variety of downscaling and/or upscaling ratios without changing overall brightness or other image parameter of a convolved result. Additionally, normalization may compensate for any numerical inaccuracies in an interpolation of a filter phase that might otherwise cause a dimming or brightening, which may be more noticeable on moving images. It should be appreciated that any of a variety of up, down, symmetric horizontal, symmetric vertical, asymmetric horizontal, and/or asymmetric vertical types of scaling may be used.

With reference to pixel processing flow 600-2, at 609-2, filter coefficients resolved at 606 are normalized to provide normalized versions of such filter coefficients. At 608-2, such normalized versions of filter coefficients obtained at 609-2 are applied to associated source pixels, namely the previously described source pixels in a space of a filter kernel at 604, in a convolution to provide a convolution result. Such convolution may be a horizontal, a vertical, and/or a two dimensional ("2-D") convolution. At 610, a normalized-convolved result may be output. Again, interpolation, convolution, and normalization, as described above, may all be performed within a single output pixel time in hardware.

It should be understood that any of a variety of a number of phases and/or scales may be generated using an oversampled filter as described herein. A set of filter coefficients may be obtained specific to an output pixel, and such filter coefficients may be applied to input pixels surrounding such output pixel in a convolution. Such convolution result for such filter coefficients may be normalized allowing for phase and/or scale variation. Furthermore, such variation facilitates applications associate with non-linear image mapping and/or non-uniform scaling, such as where output pixels are not evenly space with respect to input pixels for example. In such applications, image quality may be provided uniformly without aliasing. Furthermore, in applications where dynamic scaling is used, namely where scale factors may change at an arbitrary rate, oversampled filtering as described herein may be used.

For purposes of clarity by way of example and not limitation, the example of real-time video filtering is used in order to provide a more thorough appreciation of one or more embodiments hereof. For real-time video filtering, filtering in a horizontal direction and a vertical direction in separate operations, namely separable filtering, may be computationally efficient. Nevertheless, separable filtering may have limitations when compared to 2-D filtering, such as previously described for example. While the above-described Gaussian filter may accurately be decomposed into separable filters, some useful filters cannot be accurately decomposed into separable filters, such as a 2-D windowed sinc filter for example.

Figures 1, 7:
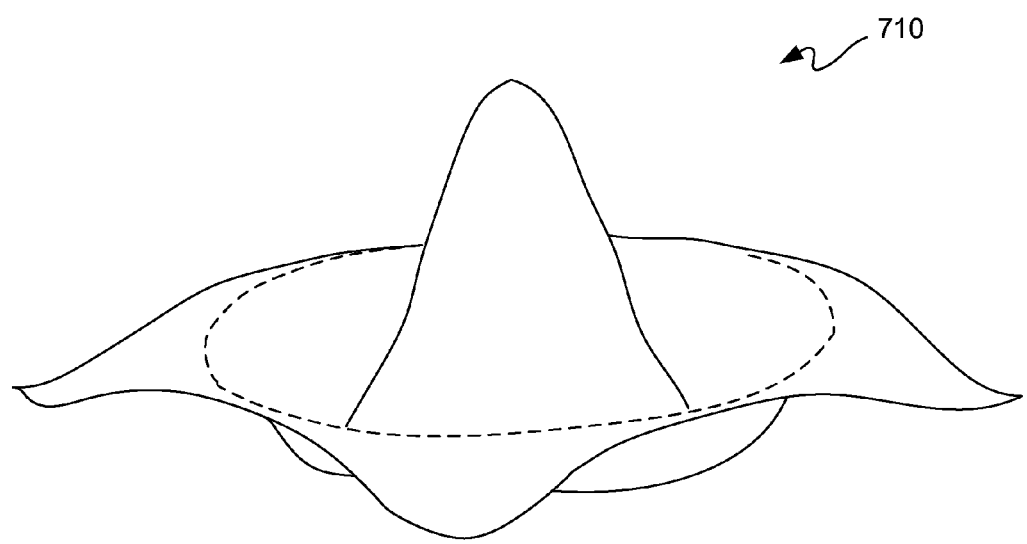

FIG. 7-1 is a perspective view depicting an exemplary embodiment of a 2-D windowed sinc filter 710. In an embodiment, oversampled filter 230 of FIG. 2 may be 2-D windowed sinc filter 710. However, in another embodiment, windowed sinc filter 710 may be used as a separable filter, namely a 1-D windowed sinc filter, for filtering in a horizontal direction and/or vertical direction. In other words, even in instances where a grid of output pixels is not aligned, namely rotated, with respect to a grid of input pixels, an asymmetric filter may be used in a separable filter configuration. Thus, even where output lines, e.g. grid of destination pixels, are curved or rotated with respect to input lines, e.g. grid of source pixels, asymmetric filters may be used. There may be applications where filtering in a first direction and then filtering in a second direction uses substantially fewer multiplications than filtering in both directions at the same time. Furthermore, heretofore, in GPUs, bilinear interpolation is used for texture mapping (i.e., render to texture) at a significant loss of quality; however, here a multi-pass FIR filter may be used with the ability to perform a variety of rotations and/or scalings with a high image quality.

Heretofore, convolution of a 1-D windowed sinc filter 710 separately in the horizontal and vertical directions would yield a poor or substantially inaccurate filter representation result due to unwanted artifacts being added. However, because arbitrary remappings may be used as described herein, any 2-D filter may be used. In other words, either or both accurately separable 2-D filters, such as 2-D Gaussian filters for example, or inaccurately separable 2-D filters, such as 2-D windowed sinc filters for example, may be used as described herein with a high-quality image result.

FIG. 7-2 is a grid diagram a depicting an exemplary embodiment of a warping map 700. Warping map 700 may be specified by a sparse grid 701 of destination pixel locations, namely destination pixels 303. In other words, destination pixels 303 are a destination warped output. For example, if a camera is off-axis or an object is off axis within a fixed field of view of a camera, such as a camera with a fisheye lens for example, then a warping map may be determined based on various data points, such as for example position of camera, position of observer relative to display, and virtual position relative to camera. Such a warping may be used to determine how source pixels from a camera are to map to destination pixels of a display to provide a rectilinear image or an object centered image without moving the camera. Moreover, multiple panoramic displays for example at various vantage viewing points may be provided from a single camera source.

Furthermore, a heads-up display onto a curved windshield is another example for predistortion.

Such sparse grid 701 of destination pixel locations may be an (x, y) mapping unto a source pixel grid. Scale, namely X and/or Y scale for example, may be specified for such mapping. In other words, destination pixels 303 are points for which x, y location and X, Y scale, relative to source pixels, may be stored. Warped grid 702 may represent source pixels, namely an input.

A value for each destination pixel 303 may be determined by convolving a filter phase therefor with surrounding source pixels, as previously described. In other words, a customized or tailored filter phase for a destination pixel 303, as previously described, may be convolved with source pixels 301 of a filter kernel 310 to provide a value for such destination pixel 303.

Along those lines, it should be appreciated that a wide range of magnification factors and/or reduction factors may be accommodated using a single oversampled filter. In other words, ability to stretch or shrink a filter kernel dynamically according to each destination pixel instance may be used to provide smooth transitioning from magnification to reduction or from reduction to magnification with effectively low-pass filtering to reduce artifacts. Such low-pass filtering may be automatic in a sense, because dynamic adjustment of a filter kernel provides such filtering. Such low-pass filtering may be additional in a sense, because the increase in the size of the filter kernel increases the number of source pixels filtered and lowers the cutoff frequency of the filter operation.

Figure 8:
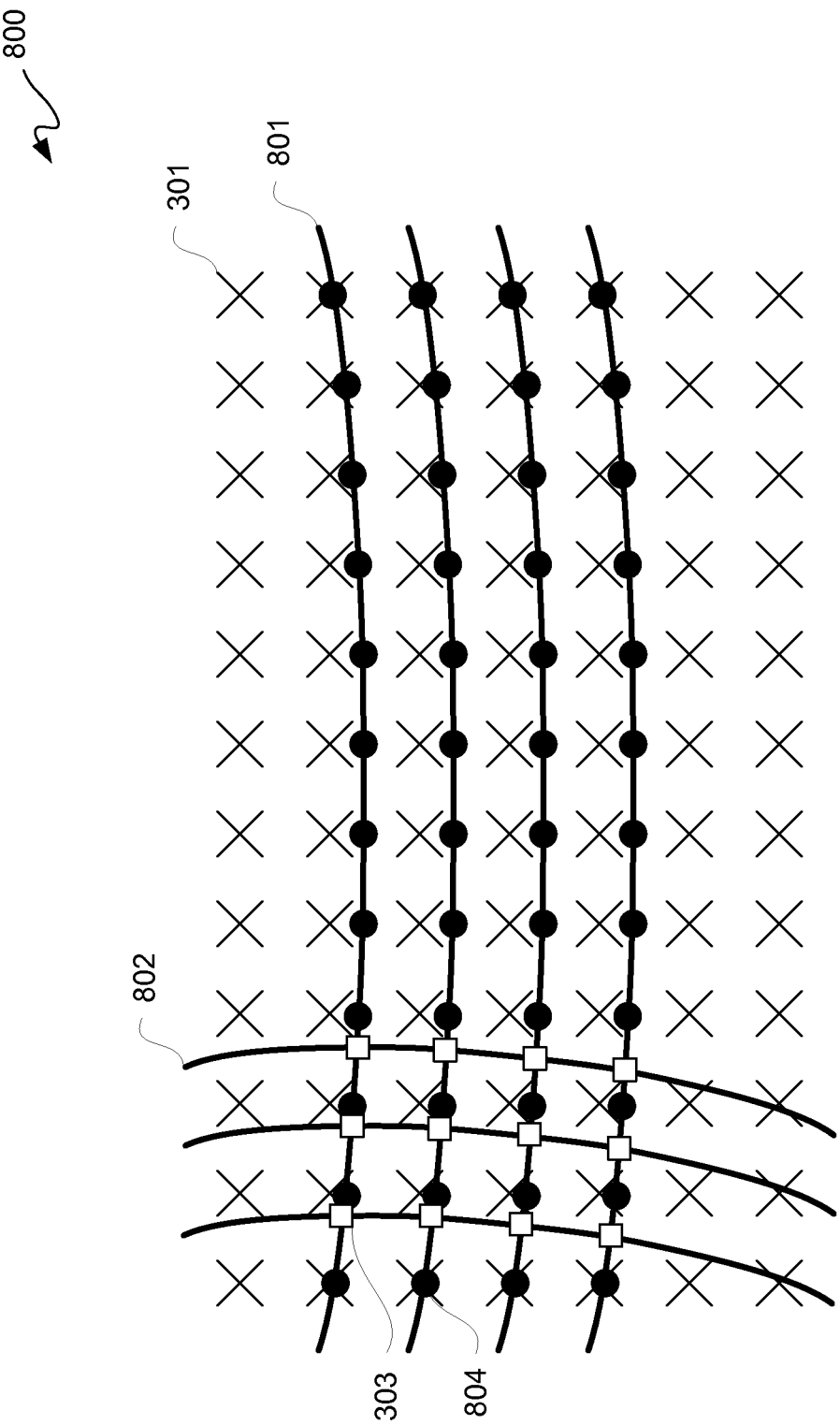
FIG. 8 is a graphical diagram depicting an exemplary embodiment of separable filtering using intermediate pixels.

FIG. 8 is a graphical diagram depicting an exemplary embodiment of separable filtering 800 using intermediate pixels 804. In separable filtering 800, x's represent source pixels 301; squares represent destination pixels 303D; and dots represent intermediate pixels 804.

As previously described, 2-D filtering may be performed using separable 1-D filters provided, however, axes of source and destination pixels are approximately aligned. Such approximate alignment is to limit distortion and rotation. Along those lines, a 1-D FIR filter may be applied to source pixels 301 in a first direction to generate an intermediate pixel 804, where such intermediate pixel generally aligns with destination pixels in a second direction orthogonal to the first direction. For purposes of clarity by way of example and not limitation, if the first direction is the y-direction, then intermediate pixels 804 generally align with destination pixels in the x-direction. For this example, generally vertical lines 802 represent a first direction of filtering. Intermediate pixels 804 may then be filtered in an orthogonal direction to such first direction, such as the x-direction for example, to obtain a final value for destination pixels 303. In this example, generally horizontal lines 801 represent a second direction of filtering. Thus, intermediate pixels 804 are for source pixels in an x-direction and for destination pixels in a y-direction after filtering in a y-direction, and destination pixels 303 are after filtering in an x-direction along destination scan lines.

In FIG. 8, each of two 1-D filters may be provided analogously with respect to a 2-D filter previously described herein. Thus, in an embodiment, an oversampled filter in each of predistortion blocks 210 and 211 of FIG. 2 may be a 1-D filter, such as a 1-D FIR filter for example. In another embodiment, a 2-D filter may be used separated into 1-D phases. However, processing of pixels is as previously described. Along those lines to briefly summarize, a custom filter phase may be generated based on location of output pixels with respect to the input pixel grid and on scale, as follows. Coefficients may be looked up by an oversampled filter according to locations of input pixels with respect to a filter kernel and according to scale of input-to-output pixels. Such filter kernel may be centered to an output pixel, and size of such filter kernel may vary according to scaling. Normalization may be provided by dividing a result of each FIR filter operation by a sum of coefficients for such operation.

Figure 9:
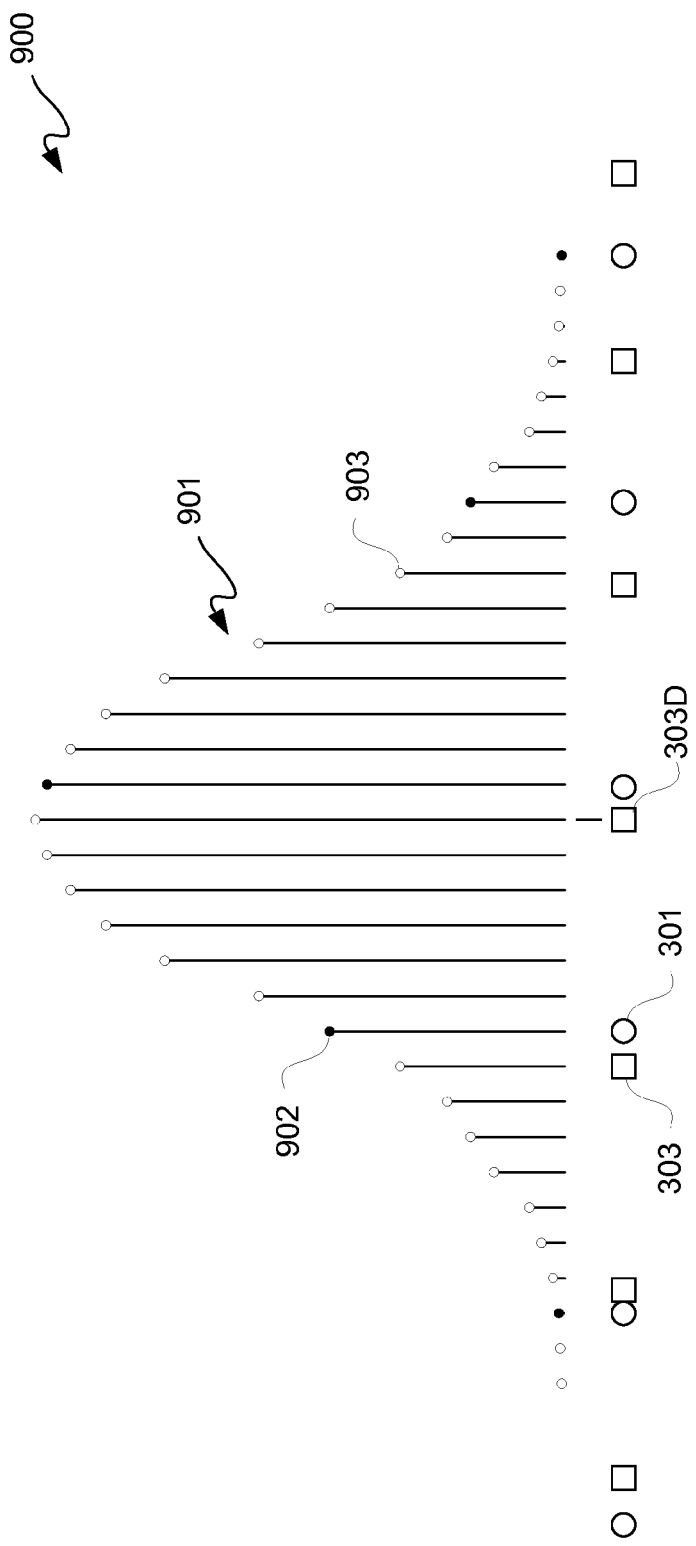
FIG. 9 is a graphical diagram depicting an exemplary embodiment of a filter phase for 1-D filtering.

FIG. 9 is a graphical diagram depicting an exemplary embodiment of a filter phase 900 for 1-D filtering. In filter phase 900, a distribution 901 of filter coefficients and associated magnitudes of the filter coefficients, such as from an oversampled filter lookup table, is illustratively depicted as a bell-shaped curve. Solid dots 902 indicate selected filter coefficients. Clear dots represent stored coefficients 903. A destination pixel 303D may be centered to distribution 901. Destination pixels 303 are represented as squares, and source pixels 301 are represented as circles.

With simultaneous reference to FIGS. 8 and 9, separable filtering is further described. In response to rows and columns of source pixels 301 being approximately orthogonal with respect to rows and columns of destination pixels 303, a non-linear separable filtering as described herein may be used. Such non-linear separable filtering as described herein may be useful to reduce computational load. It should be appreciated that non-linear separable filtering as described herein may be used for non-linear warping. Furthermore, 1-D phases may be customized or tailored dynamically for each output location, such as destination pixel 303D for example, responsive to location and scaling of such destination pixel with respect to a source pixel grid.

Figure 10:
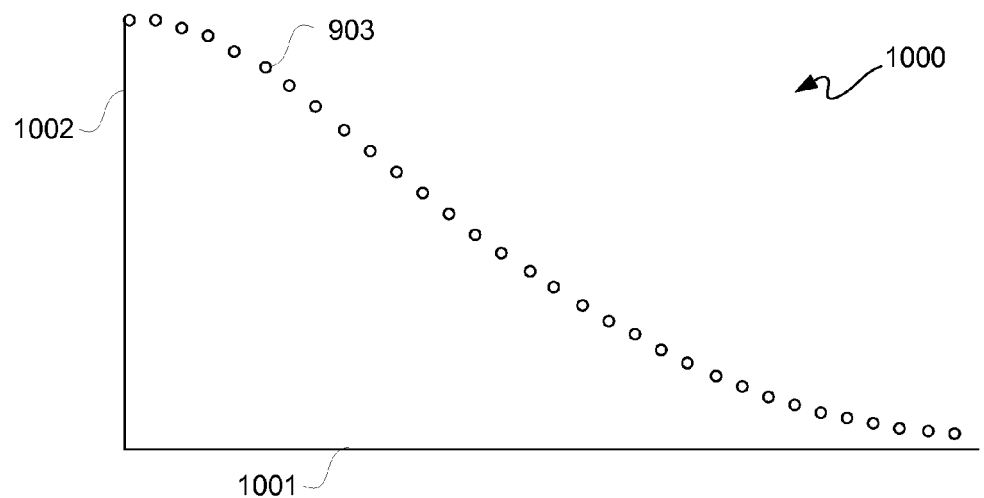
FIG. 10 is a graphical diagram depicting an exemplary embodiment of a radial storage for an oversampled filter.

FIG. 10 is a graphical diagram depicting an exemplary embodiment of a radial storage 1000 for an oversampled filter 230. X-axis 1001 generally indicates a distance from a center of the filter kernel, and y-axis 1002 generally indicates coefficient magnitude. Dots or circles indicate stored coefficients 903.

In an embodiment where 2-D filtering is used without being separated into 1-D phases, multiple copies of oversampled filter 230 may be used to look up multiple coefficients in parallel. With respect to video filters for example, such filters may be nominally circular and radially symmetric. To reduce storage size of such an oversampled filter 230, a single quadrant of coefficients may be stored, for example in oversampled filter 230, to generate an entire spectrum of coefficients to be used. In another embodiment, filter coefficients may be stored in a radial 1-D orientation and looked up by distance from the center of a filter kernel. In either of such embodiments, storage requirements of an oversampled filter 230 may be substantially reduced. With respect to the latter embodiment, reduction in storage size may be exponential.

For purposes of clarity by way of example and not limitation, an oversampled filter 230 of size 64×64 coefficients may be used, namely approximately 4000 coefficients in total with approximately 1000 coefficients per quadrant. For such an embodiment, coefficients stored could be reduced to a 32×32 coefficient array, namely one quadrant. The other three quadrants of coefficients may be provided using the one quadrant of coefficients stored. Even though this numerical example is used, it should be understood that other coefficient array sizes may be employed. In an FPGA embodiment, coefficients may be stored in distributed RAM using a single fabric lookup table per bit.

Figure 11:
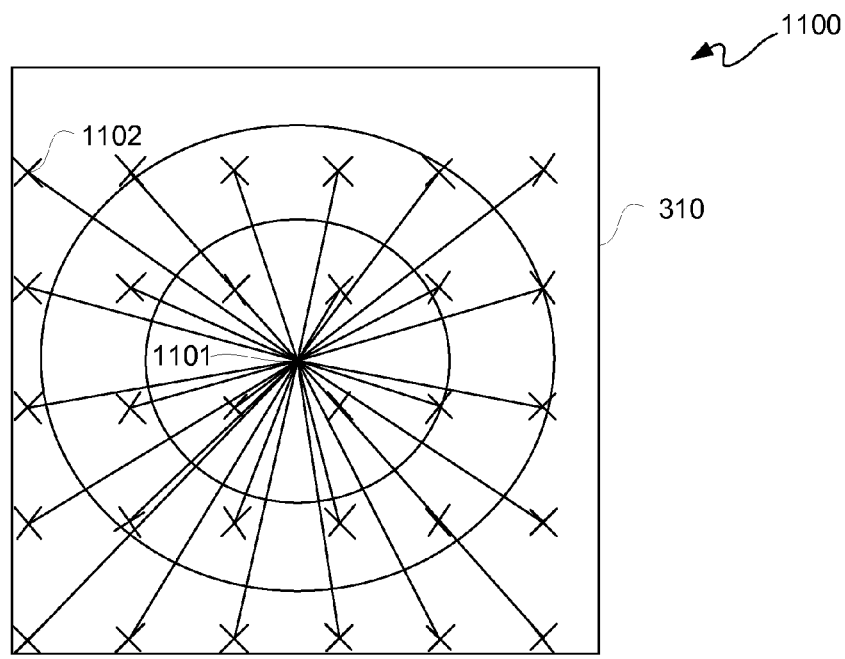
FIG. 11 is a graphical diagram depicting an exemplary embodiment of a 2-D filter phase constructed from a 1-D oversampled filter based on distance from a center of a filter kernel.

FIG. 11 is a graphical diagram depicting an exemplary embodiment of a 2-D filter phase 1100 constructed from a 1-D oversampled filter based on distance from a center 1101 of a filter kernel 310. In this embodiment, coefficient coordinates 1102, which nominally may be specified as (x, y) pairs, may be converted to distance from center 1101 of a filter kernel 310. For example, distance, d, may be set equal to the square root of (x^2+^2). Squaring of coordinates may be done dynamically; however, square roots may take too much time to determine dynamically, and thus square root values may be predetermined and stored in a lookup table. However, distances may entirely be determined dynamically or may entirely be predetermined and stored in a lookup table.

Because coefficients may be stored in a lookup table, in an embodiment each square root look up may be effectively combined with a coefficient in a same lookup table. Coefficients may be stored such that addresses represent squared distances. Other embodiments where addressing is manipulated may likewise be used. Generally, it should be appreciated that by storing coefficients, substantial accuracy and efficiency in a 1-D, radially addressed lookup table may be obtained. In embodiments with multiple copies of oversampled filter 230, such a reduction in memory usage may be substantially beneficial.

Figure 12:
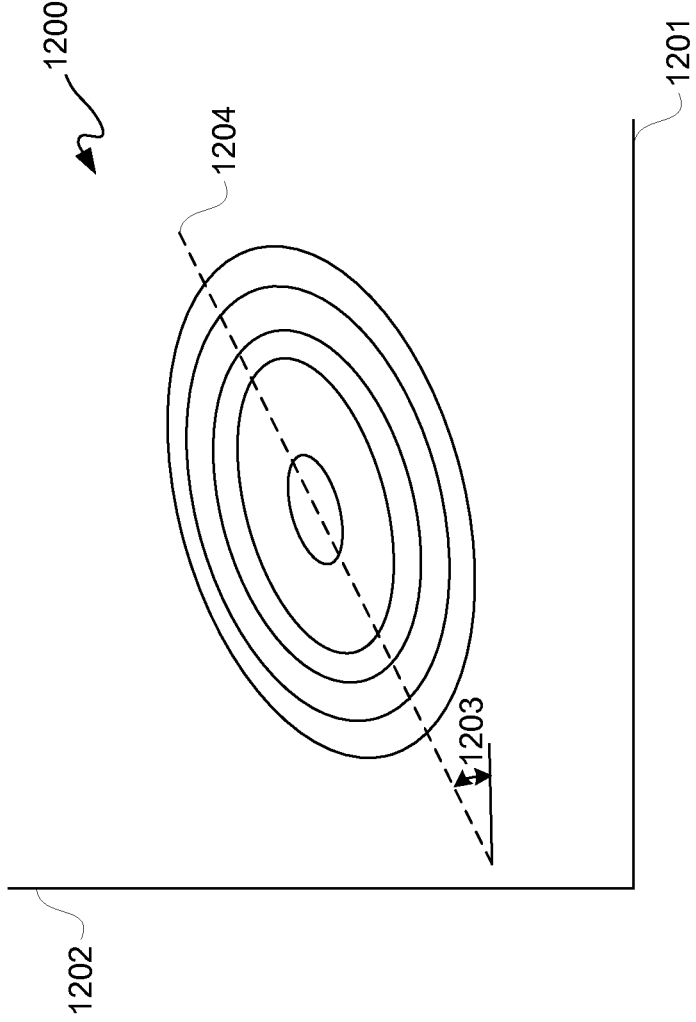
FIG. 12 is graphical diagram of a top view depicting an exemplary embodiment of an approximation of an elliptical filter.

FIG. 12 is graphical diagram for a top view depicting an exemplary embodiment of an approximation of an elliptical filter 1200. X-axis 1201 and y-axis 1202 may represent the orientation of the grid of destination pixels to which the filter will be applied. The concentric ellipses represent the contours of equi-valued coefficient in the filter. In an embodiment, change of shape of an applied filter may be performed on a per pixel basis. Such dynamic alteration of shape of an applied filter on a per pixel basis may be useful, for example, in connection with edge detection to preserve edge sharpness. Dynamic shaping of an applied filter may be performed by changing a mapping of oversampled filter 230 as that filter is applied to source pixels 301. For purposes of clarity by way of example not limitation, suppose a particular destination pixel 303 being calculated or otherwise processed is detected to lie near a strong edge at an angle 1203, such as approximately 30° for example, of orientation from a horizontal axis, namely x-axis 1201. To reduce blurring of such strong edge, as well as possibly to reduce ringing depending on an oversampled filter 230, oversampled filter 230 may have its filter coordinates compressed in a direction perpendicular to such edge. This compression may form an approximate elliptical filter 1200 for such oversampled filter 230 with a major axis 1204 thereof parallel to such strong edge.

Accordingly, similar variations of a basic or default filter shape may be realized by manipulation of filter coordinates used to look up coefficients of oversampled filter 230. The above example of a 30-degree edge indicates steps that may be used to obtain a coefficient for a particular source pixel. By determining a cosine between a vector from a filter center to such source pixel and orientation of such edge, and by determining two subtracted from such cosine result to provide a resulting number to scale distance from such a source pixel to such filter center, the resulting distance may be used to look up a coefficient, such as in a lookup table ("LUT"), for such source pixel. Effectively, source pixels perpendicular to an edge may use coefficient addresses twice as distant as coefficient addresses parallel to the edge, and thus contribute less to edge blurring for example. Accordingly, it generally should be understood that the above example may be used to calculate distances for coefficient look ups. However, in other embodiments, approximations may be used, and calculations may be simplified by predetermining values for storage in a lookup table. However, in either or both embodiments, dynamic filter shaping may be used.

Head Up Display

With the above description borne in mind, a head up display, such as for a vehicle for example, is further described. Such head up display is described below as being in an automobile; however, in other embodiments other types of vehicles may be used. More particularly, a head up display with a wide angle of view displayable on an automobile windshield is described, where images from sensors, cameras, and/or navigation imagery may be digitally distortion corrected, rotated, and/or scaled. Such image processing may be to match an out-the-window view of a driver of such an automobile. Furthermore, a wide field of view, use of dashboard surface, and/or registration of sensor/navigation imagery may be provided with such an out-the-window view accounting for driver viewing position.

It should be appreciated that a head up display ("HUD") includes a display device and image combiner. For automobiles, a windshield may be used as an image combiner; however, a windshield has limitations associated with having an aspherically curved surface which causes distortion. Furthermore, a display device and optics conventionally were embedded in a dashboard, which limited placement and available area for such display device.

FIG. 13 is a pictorial diagram depicting an exemplary embodiment of a conventional HUD-out-the-window view 1300. An automobile having a dashboard 1301 and a windshield 1302 may also have a conventional HUD system. Such conventional HUD system may display a sensor image 1303 from a sensor camera. However, sensor image 1303 is small and does not correspond spatially to a driver's out-the-window view. This may be due to a limitation of a conventional HUD system. Conventional HUD systems are limited to a small area of a windshield such that: distortion is not severe; and a HUD unit can fit inside a dashboard. In some conventional HUD systems, an expensive windshield-specific aspherical mirror is used to correct windshield introduced distortion. Thus, a conventional HUD system to cover a larger area of the windshield would involve: exotic optics to minimize artifacts over such a large area; and a significant amount of space within a dashboard to house such expansive optics. Furthermore, placement of such optics relative to a windshield for which they are specifically designed may be problematic.

FIG. 14 is a pictorial-block diagram depicting an exemplary embodiment of a HUD-out-the-window view ("HUD view") 1400. An automobile having a dashboard 1301 and a windshield 1302 may also have one or more HUDs. In this exemplary embodiment, a HUD 1450 is in-dashboard ("in-dash") mounted. In another embodiment, a HUD 1460 is on-dashboard ("on-dash") mounted. In yet another embodiment, both an on-dash HUD 1460 and an in-dash HUD 1450 may be used. Either or both of HUDs 1450 and 1460 may be coupled to a video processing and graphics module, such as video processing and graphics module 1607 of FIG. 16 for example. Such a video processing and graphics module may include image predistorter 200, which includes a predistortion block 210 of FIG. 2. Along those lines, predistortion block 210 may be coupled to a global positioning system, such as GPS 1606 of FIG. 16 for example, for projection of navigation symbology; as described below in additional detail. Image predistorter 200 may be configured to provide an image of the navigation symbology predistorted for projection onto a windshield in perspective.

In contrast to HUD view 1300, HUD view 1400 on windshield 1302 includes a large display of a sensor image 1403 registered and pre-distorted to correspond with an out-the-window scene as seen by a driver. Sensor image 1402 may be overlayed with correlated object identification symbology. Also, a navigation direction arrow 1404 may be displayed outside the boundaries of a conventional HUD view. Navigation direction arrow 1404 may likewise be registered and pre-distorted to correspond with such an out-the-window scene, and may give an indication as to how far down the road an upcoming right turn is to occur. This is just one example among many of how use of more of windshield area for a HUD may be beneficial. By providing more useful information in front of a driver by utilizing a larger portion of a windshield, driving may be made safer and easier.

Along those lines, visual artifacts may be corrected digitally, and a top surface 1410 of dashboard 1301 may be used for display to significantly increase display area. Sensor images, such as infrared for night and/or foggy vision, may be size and distortion corrected to match perspective from a driver's viewpoint. Navigation symbology, including GPS navigation symbology, may be displayed in true perspective over roads, among other out-the-window viewable objects. Furthermore, multiple displays may be accommodated. Use of expensive windshield-shape-specific optics may be avoided, and mirrors may be planar or spherical mirrors rather than aspherical mirrors. Distortion correction for a HUD may be adaptable to a wide variety of windshields and/or display placement options. Fine registration of a HUD image for drivers with different heights and seat positions may be possible in a simple procedure analogous to adjusting a rearview mirror. Other display technologies that can take non-planar shapes, such as organic light emitting diode ("OLED") for example, may be incorporated into a dashboard design. Additionally, common and inexpensive lenticular material may be used over on-dash displays to block a driver's direct view of a display, such that only an image reflected, namely a reflected image, in a windshield is seen. Moreover, rear and side view camera views may be positioned on a windshield for more convenient viewing.

For an in-dash HUD 1450, a virtual image may be made to appear further from a driver. As previously described herein, digital image warping may be used to perform distortion correction. Thus, a single HUD 1450 may be used with any windshield, which enhances economic feasibility of such a system as economies of scale are promoted. Furthermore, image size and location may be adjusted to coincide with driver position.

Figure 17:
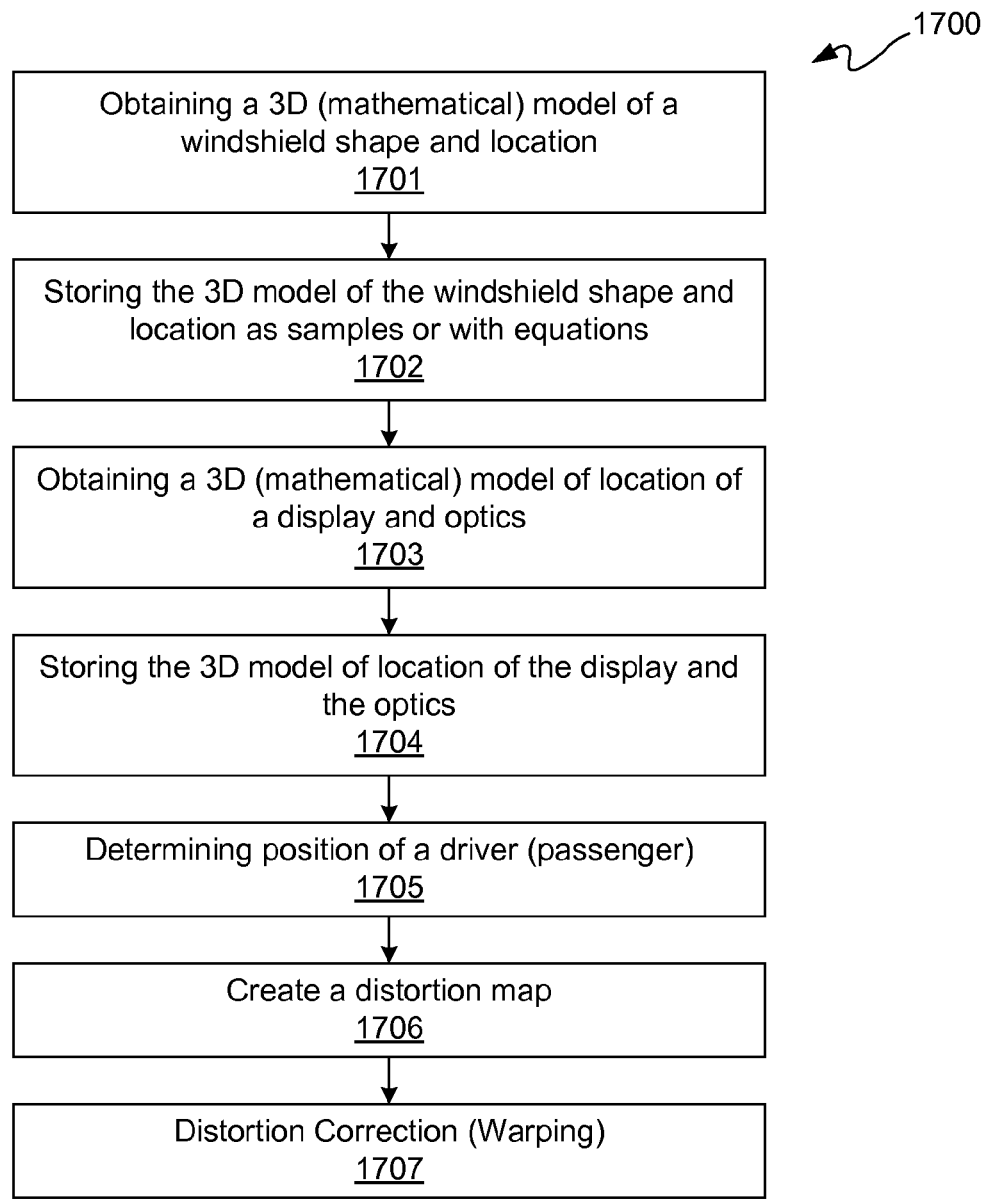
FIG. 17 is a flow diagram depicting an exemplary embodiment of a HUD setup flow.

FIG. 17 is a flow diagram depicting an exemplary embodiment of a HUD setup flow 1700. HUD setup flow 1700 is further described with simultaneous reference to FIGS. 14 and 17.

At 1701, a 3D model of a windshield shape and location of windshield 1302 is obtained. This 3D model may be a mathematical model. At 1702, the 3D model obtained at 1701 is stored in memory, such as of module 1607 of FIG. 16. Such 3D model may be stored either as samples or with equations. At 1703, a 3D model of location of a HUD 1450 and optics for such a HUD 1450 are obtained. At 1704, the 3D model obtained at 1703 is stored in memory, such as of module 1607 of FIG. 16. Once the 3D models at 1702 and 1704 are stored, they may be reused for each driver position or reposition as described below.

At 1705, position of a driver is determined. It is assumed for purposes of clarity and not limitation that a HUD 1450 for a driver is used. However, there likewise may be a HUD system for a passenger and/or a HUD 1460. In an embodiment for positioning a HUD 1450 for a driver, two small dots 1451, such as may be inscribed or otherwise located on a windshield 1302, are used. Even though two dots are used, any number of dots or other objects may be used for this alignment.

HUD 1450 projects a virtual image of two small dots. A driver then positions the two virtual dots imaged for respective alignment with dots 1451. Positioning of HUD displayed dots by a driver may be performed with power adjustment controls, which may be similar to power mirror adjustment controls, for position a HUD 1450. Thus, a complete geometry of driver's viewing position to a HUD image is established. Likewise, geometry of a camera's field of view to a driver's viewing position may be established.

At 1706, a distortion map is created. Such distortion map may be created by accessing the 3D models stored, and then mapping pixels at a source display to a destination in a virtual image for a driver's position. Creation of a distortion map was previously described elsewhere herein, and thus is not repeated here. At 1707, using the distortion map created at 1706, distortion correction, or warping, is performed, such as previously described elsewhere herein, and thus is not repeated here. Operations 1705 through 1707 may be performed only when a driver's position changes, and thus such operations do not have to be performed as real-time calculations throughout a driving experience. In addition to flexibility to account for any of a variety of different windshield shapes, registration of an image to each driver's view is facilitated.

On-dash HUD 1460 may be used in place of, or in addition to, in-dash HUD 1450. By being on-dash, on-dash HUD 1460 may be positioned such that it does not interfere with ventilation ducts, instruments, steering column, and/or other components within dashboard 1301. Furthermore, HUD 1460 may be flush mounted. For purposes of clarity by way of example and not limitation, HUD 1460 may include an LCD or other flat panel display inserted in a surface of dashboard 1301 with a selectable HUD application ("app"), such as an iPhone or iPad app. In another embodiment, an OLED flexible display may be incorporated into a top surface 1410 of dashboard 1301. Curving of such a flexible display may introduce some distortion; however, such distortion may be accommodated by registration and digital distortion correction, as previously described.

Figure 15:
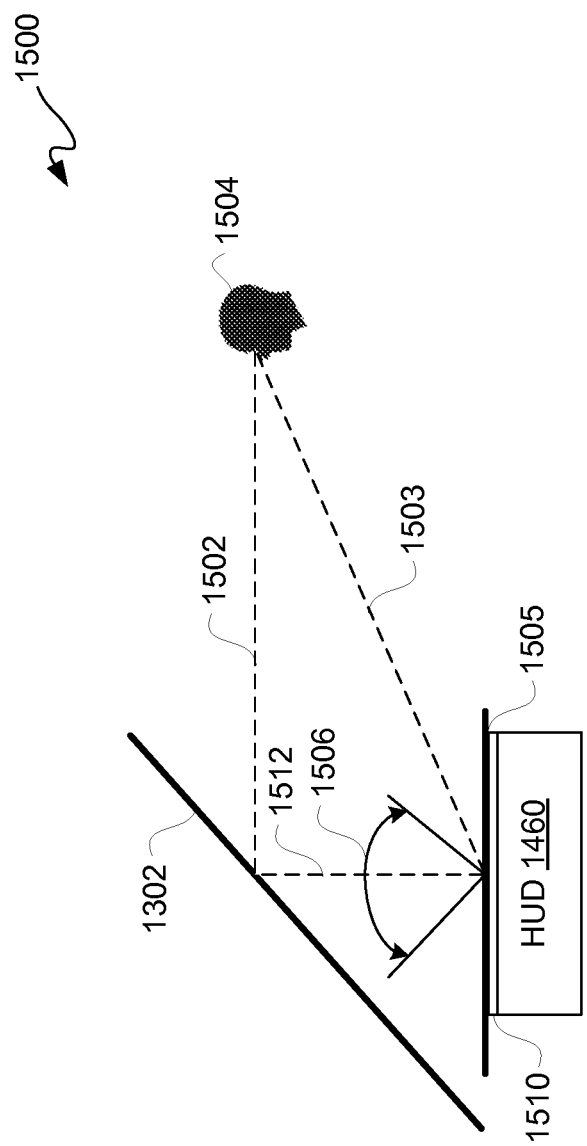
FIG. 15 is a ray-trace diagram depicting an exemplary embodiment of a driver's view with an on-dash HUD having a lenticular cover.

FIG. 15 is a ray-trace diagram depicting an exemplary embodiment of a driver's view with an on-dash HUD 1460 having a lenticular cover 1505. In order to prevent driver distraction from direct viewing of a flat display panel or a flexible display panel of a HUD 1460, a lenticular cover 1505 may be placed over such panel to block a driver's direct view 1503. Furthermore, use of such a lenticular cover 1505 may reduce extra ambient light from such panel, which may be distracting during nighttime driving conditions.

In an embodiment, a lenticular plastic used to provide lenticular cover 1505 is aligned to pixels of a display panel 1510 of HUD 1460. Such alignment may be with the grain of lenticular lenses of lenticular cover 1505 oriented perpendicular to a driver's line of sight, namely perpendicular to a reflected visible view 1502 of driver 1504. Lenticular lenses of lenticular cover 1505 have a limited viewing angle 1506 which blocks an offset angle view 1503 from a driver 1504, but allows a more direct view, such as perpendicular view 1512, to pass for being reflected in windshield 1302 to provide a reflected visible view 1502 for a driver 1504.

Figure 16:
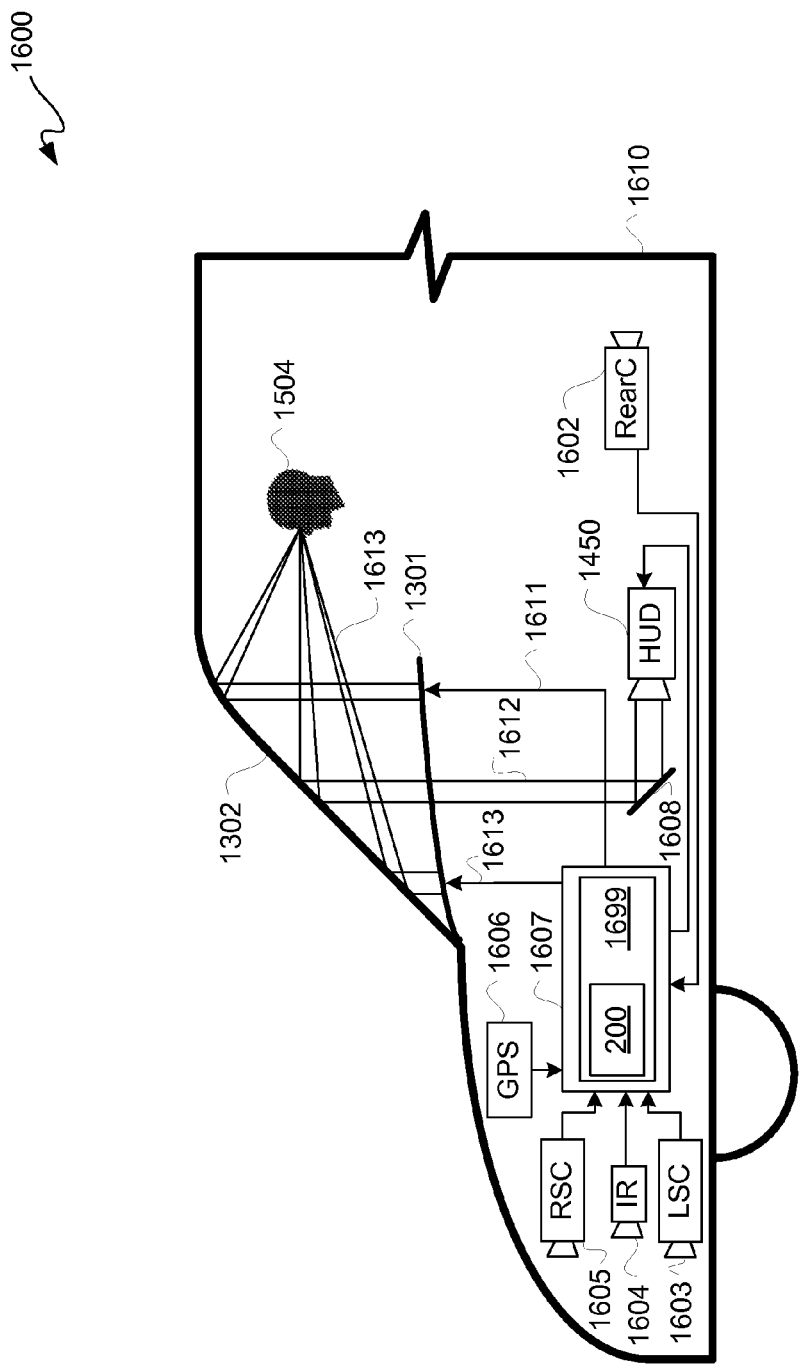
FIG. 16 is a block diagram depicting an exemplary embodiment of a HUD system for an automobile.

FIG. 16 is a block diagram depicting an exemplary embodiment of a HUD system 1600 for an automobile 1610. In this exemplary embodiment, a right-side camera ("RSC") 1605, an infrared ("IR") sensor 1604, a left-side camera ("LSC") 1603, a GPS 1606, and a rear camera 1602 are coupled to provide input to a video processing and graphics module 1607. An FPGA may be used to provide video processing and graphics module 1607. A HUD image may be a composite from several sources. For example, a sensor image, such as an IR image, may be combine with object identification symbology, and navigation arrows with 3D perspective rendered by a graphics processing unit ("GPU") of video processing and graphics module 1607. Thus, an integrated 3D perspective image may be provided.

An FPGA and/or one or more other integrated circuit dies may be used to provide video processing and graphics module 1607. For purposes of clarity by way of example and not limitation, video processing and graphics module 1607 may further include memory, registers, and/or other means for registering one or more sensor images and/or one or more navigation symbols with one or more camera images to provide a 3D perspective view in a display image that incorporates sensor information and/or navigation information into such 3D perspective view. For purposes of clarity by way of example and not limitation, such one or more integrated circuit dies are illustrative depicted as block 1699.

Sensor images and/or navigation symbols may be registered with one or more visual images, generally image information, to effectively provide a real-world 3D perspective view. Even though only one sensor camera is illustratively depicted, in other embodiments more than one sensor camera may be used. Furthermore, even though three visual cameras are illustratively depicted, in other embodiments fewer or more than three visual cameras may be used.

Video processing and graphics module 1607 in addition to a GPU may include one or more embedded processors and one or more DSPs. An embedded process may perform updating of a distortion map responsive to user input. A GPU may render navigation information in 3D perspective, such as a desired route represented as a wide line down a road, and symbology (e.g., speed, heading, and temperature, among others). Distortion correction, image enhancement (such as automatic gain control), object recognition, and/or video overlays, among other forms of image processing may utilize DSP capabilities of an FPGA. Opacity, size and location of various elements may be adjusted to reduce a driver's visual work load. Video processing and graphics module 1607 may include image predistorter 200, which includes a predistortion block 210 of FIG. 2. Image predistorter 200 is capable of projection of navigation symbology responsive to position information from GPS 1606, where image predistorter 200 may be configured to provide an image of navigation symbology predistorted for projection onto a windshield 1302 in perspective, as previously described.

A composite output may be provided from video processing and graphics module 1607 to HUD 1450. HUD 1450 may project an image 1612 onto a planar mirror 1608 for reflection off of windshield 1302 for visual perception by observer or driver 1504. Image 1612 may include sensor information and/or 3D navigation information. Additionally, speed and status information 1613 and rear/side view camera video 1611 may be output from video processing and graphics module 1607 to other HUDs (not shown) for reflection off of windshield 1302.

Along those lines, multiple displays can be used to display different information. Most of top surface 1410 of dashboard 1301 may be available as a display for one or more HUDs 1460. For example, dash-top displays could be used near the front to display speed and status information 1613. Sensor information combined with 3D navigation information may be generated in-dash in HUD 1450 for a main line of sight as image 1612, and on-dash HUDs 1460 near a driver may be used to display images from rear and side cameras for quick reference.

In other embodiments, a miniature laser projection technology, such as Pico-P for example, may be placed on top surface 1410 of dashboard 1301. A removable display, such as a tablet for example, may be used. Non-linear, non-spherical, ghost image cancellation using image processing may be used.

While the foregoing describes exemplary embodiments, other and further embodiments in accordance with the one or more aspects may be devised without departing from the scope thereof, which is determined by the claims that follow and equivalents thereof. Claims listing steps do not imply any order of the steps. Trademarks are the property of their respective owners.

What is claimed is:

1. An apparatus, comprising:
   a mapper configured to receive destination pixel information in terms of a source pixel space, and configured to generate a 2-dimensional filter kernel for source pixels for the destination pixel information;
   an oversampled filter including predetermined coefficients having a first grid finer than a second grid of the source pixel space;
   the oversampled filter is coupled to the mapper and configured to filter the source pixels to the first grid pattern of the predetermined coefficients for selection of filter coefficients from the predetermined coefficients;
   a filter coefficient module configured to select the filter coefficients from the predetermined coefficients stored in the oversampled filter based on proximity to the source pixels in the filter kernel for each of the source pixels in the filter kernel;
   the filter coefficient module configured to predistort a digital image associated with the source pixels for non-linear image mapping;
   a convolution module coupled to the mapper and the filter coefficient module and configured to receive the source pixels and the filter coefficients, respectively, and configured to apply the filter coefficients to the source pixels in a convolution to generate a convolution result; and
   a normalization module configured to normalize either the convolution result or the filter coefficients.

2. The apparatus according to claim 1, wherein:
   the oversampled filter is a finite impulse response filter; and
   the finite impulse response filter includes a lookup table for storing the predetermined coefficients.

3. The apparatus according to claim 1, wherein the normalization module is configured to receive the convolution result from the convolution module and configured to normalize the convolution result.

4. The apparatus according to claim 1, wherein:
   the normalization module is coupled to receive the filter coefficients from the filter coefficient module and configured to generate normalized versions of the filter coefficients;
   the normalization module is coupled to provide the normalized versions of the filter coefficients to the convolution module; and
   the convolution module is configured for application of the normalized versions of the filter coefficients to the source pixels for the convolution.

5. The apparatus according to claim 1, wherein the mapper is further coupled to receive an X-scaling factor and a Y-scaling factor for the destination pixel information.

6. The apparatus according to claim 1, wherein the oversampled filter is configurable with respect to size, shape, and orientation responsive to scaling and content of an image associated with the destination pixel information.

7. The apparatus according to claim 1, wherein:
   the filter coefficient module is configured to store the filter coefficients in a lookup table for retrieval; and the lookup table is configured to retrieve the filter coefficients responsive to distance from a center of the oversampled filter.

8. The apparatus according to claim 1, wherein:
the oversampled filter is configured to be dynamically shaped responsive to an applied filter; and
the filter coordinates used to look up the predetermined coefficients of the oversampled filter are remappable responsive to the applied filter.

9. The apparatus according to claim 1, wherein:
the filter coefficient module is configured to store the predetermined coefficients in a lookup table with addresses representing distances; and
the lookup table is configured as a one-dimensional, radially addressed lookup table.

10. A vehicle, comprising:
a video and graphics processing module having an image predistorter;
the image predistorter having a filter coefficient module including an oversampled filter configured to predistort a digital image for a non-linear image mapping of a display image to a three dimensional perspective;
the image predistorter including:
a mapper configured to receive destination pixel information in terms of a source pixel space, and configured to generate a 2-dimensional filter kernel for source pixels for the destination pixel information;
wherein the destination pixel information is for the navigation symbology;
the oversampled filter including predetermined coefficients having a first grid finer than a second grid of the source pixel space;
the oversampled filter coupled to the mapper and configured to filter the source pixels to the first grid pattern of the predetermined coefficients for selection of filter coefficients from the predetermined coefficients;
the filter coefficient module configured to select the filter coefficients from the predetermined coefficients stored in the oversampled filter based on proximity to the source pixels in the filter kernel for each of the source pixels in the filter kernel; and
the filter coefficient module configured to predistort the digital image associated with the source pixels for the non-linear image mapping thereof;
a head up display ("HUD") coupled to the video and graphics processing module;
a global positioning system coupled to the video and graphics processing module;
at least one camera coupled to the video and graphics processing module;
wherein the global positioning system is configured to generate navigation symbology for the video and graphics processing module responsive to position information;
wherein the video and graphics processing module is configured to register the navigation symbology from the global positioning system with image information from the at least one camera, and further configured to provide the display image;
wherein the image predistorter is configured to predistort the digital image for projection of the display image onto a windshield in the three dimensional perspective; and
wherein the HUD is configured to receive the predistorted display image for projection thereof.

11. The vehicle according to claim 10, wherein the image predistorter comprises:

a convolution module coupled to the mapper and the filter coefficient module and configured to receive the source pixels from the mapper and the filter coefficients from the filter coefficient module, and configured to apply the filter coefficients to the source pixels in a convolution to generate a convolution result; and
a normalization module coupled to the convolution module or the filter coefficient module and configured to normalize either the convolution result or the filter coefficients, respectively.

12. The vehicle according to claim 10, wherein the HUD is configured to project the predistorted display image onto the windshield in the three dimensional perspective visually aligned with real-world objects viewable by a driver.

13. The vehicle according to claim 10, wherein the HUD is an on-dash HUD.

14. The vehicle according to claim 10, further comprising:
a lenticular material positioned over the HUD;
wherein the display image is not directly viewable due to being obscured by the lenticular material; and
wherein the display image is configured for viewing as a reflected image in the windshield.

15. A vehicle, comprising:
a video and graphics processing module having an image predistorter;
the image predistorter having a filter coefficient module including an oversampled filter configured to predistort a digital image for a non-linear image mapping of a display image to a three dimensional perspective;
the image predistorter including:
a mapper configured to receive destination pixel information in terms of a source pixel space and configured to generate a 2-dimensional filter kernel for source pixels for the destination pixel information;
the oversampled filter including predetermined coefficients having a first grid finer than a second grid of the source pixel space;
the oversampled filter coupled to the mapper and configured to filter the source pixels to the first grid pattern of the predetermined coefficients for selection of filter coefficients from the predetermined coefficients;
the filter coefficient module configured to select the filter coefficients from the predetermined coefficients stored in the oversampled filter based on proximity to the source pixels in the filter kernel; and
the filter coefficient module configured to predistort the digital image associated with the source pixels for the non-linear image mapping thereof;
a head up display ("HUD") coupled to the video and graphics processing module;
at least one sensor camera coupled to the video and graphics processing module;
at least one visual camera coupled to the video and graphics processing module;
wherein the video and graphics processing module is configured to register a sensor image from the at least one sensor camera with a visual image from the at least one visual camera, and further configured to generate the display image;
wherein the image predistorter is configured to predistort the digital image for projection of the display image onto a windshield in the three dimensional perspective; and
wherein the HUD is configured to receive the predistorted display image for projection thereof.

16. The vehicle according to claim 15, wherein the image predistorter includes:

a convolution module coupled to the mapper and the filter coefficient module and configured to receive the source pixels from the mapper and the filter coefficients from the filter coefficient module, and configured to apply the filter coefficients to the source pixels in a convolution to generate a convolution result; and a normalization module coupled to the convolution module or the filter coefficient module and configured to normalize either the convolution result or the filter coefficients, respectively.

17. The vehicle according to claim 15, wherein the HUD is an in-dash HUD.

18. The vehicle according to claim 15, wherein the HUD is an on-dash HUD.

19. The vehicle according to claim 15, wherein the HUD is configured to project the predistorted display image onto the windshield in the three dimensional perspective visually aligned with real-world objects viewable by a driver.

20. The vehicle according to claim 15, further comprising:

a lenticular material positioned over the HUD;

wherein the display image is not directly viewable due to being obscured by the lenticular material; and wherein the display image is configured for viewing as a reflected image in the windshield.

* * * * *